United States Patent [19]

Clark et al.

[11] Patent Number: 5,009,771
[45] Date of Patent: Apr. 23, 1991

[54] HYDROCONVERSION PROCESS USING MIXED CATALYST SYSTEM

[75] Inventors: Frederick T. Clark, Wheaton, Ill.; Albert L. Hensley, Jr., Munster, Ind.; David Lyzinski, Wheaton, Ill.; Lawrence B. Peck, Houston, Tex.

[73] Assignee: Amoco Corporation, Chicago, Ill.

[21] Appl. No.: 502,297

[22] Filed: Mar. 30, 1990

[51] Int. Cl.$^5$ ................................................ C10G 45/04
[52] U.S. Cl. .............................. 208/216 PP; 208/209; 208/213; 208/216 R; 208/251 H; 208/254 H; 502/314; 502/355
[58] Field of Search ............. 208/210, 216 PP, 251 H, 208/216 R, 209, 213, 254 H; 502/67

[56] References Cited

U.S. PATENT DOCUMENTS

| | | | |
|---|---|---|---|
| 3,898,155 | 8/1975 | Wilson | 208/216 PP |
| 4,341,625 | 7/1982 | Tamn | 208/216 PP |
| 4,548,709 | 10/1985 | Bowes et al. | 208/216 PP |
| 4,657,665 | 4/1987 | Beaton et al. | 208/216 R |
| 4,707,466 | 11/1987 | Beaton et al. | 502/313 |
| 4,789,462 | 12/1988 | Byrae et al. | 208/216 PP |

*Primary Examiner*—Anthony McFarlane
*Assistant Examiner*—Nhat Phan
*Attorney, Agent, or Firm*—Ekkehard Schoettle; William H. Magidson; Ralph C. Medhurst

[57] ABSTRACT

Disclosed is an improved process for the hydrodemetallization, hydrodesulfurization, hydrodenitrogenation, and hydroconversion of a hydrocarbon feedstock containing asphaltenes, metals and Shell hot filtration solids precursors. The process utilizes a catalyst mixture wherein one component of the mixture is a relatively small pore catalyst and another component is a catalyst that possesses a relatively large amount of macropore volume.

16 Claims, 13 Drawing Sheets

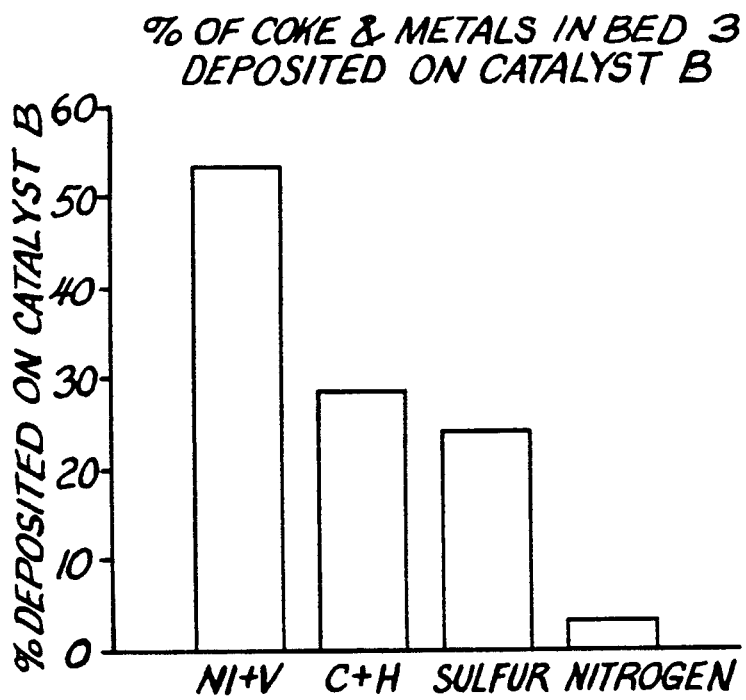
FIG. 13
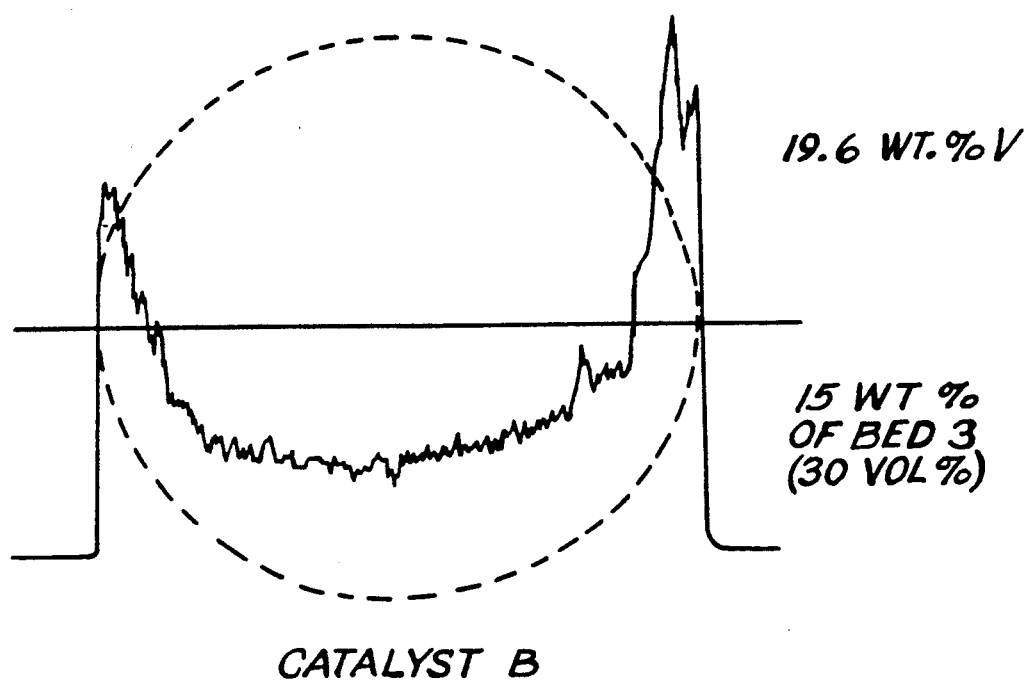
FIG. 14.A

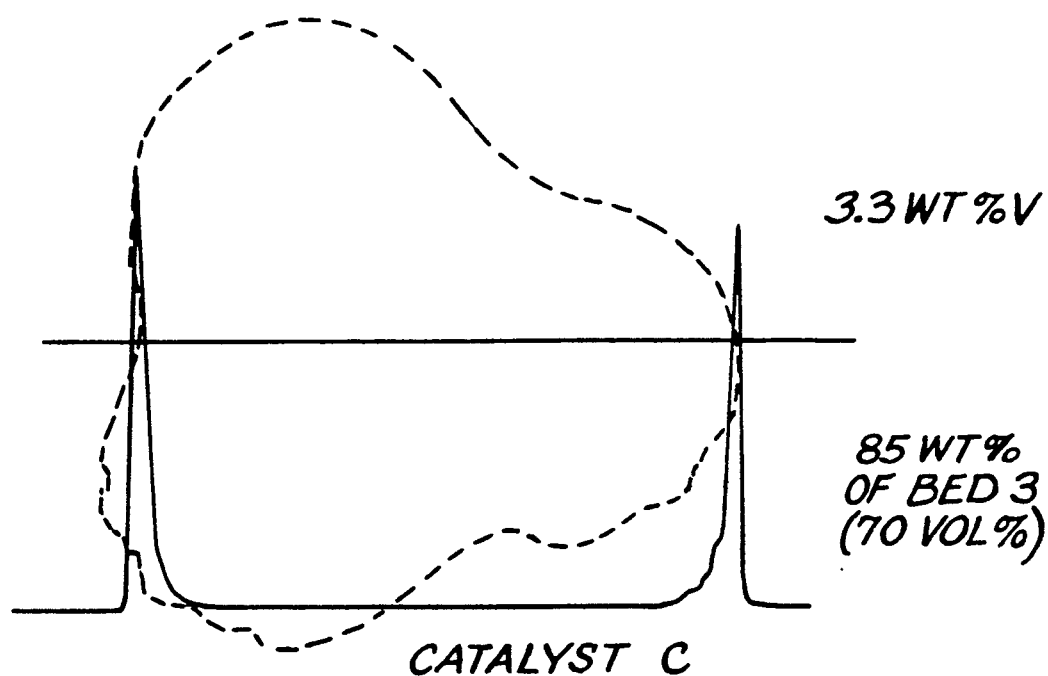
FIG. 14.B
VANADIUM PROFILES: MIXED CATALYST IN BED 3
AFTER 70 DAYS IN OIL (RUN 6)
3.3 WT % V
85 WT %
OF BED 3
(70 VOL %)
CATALYST C
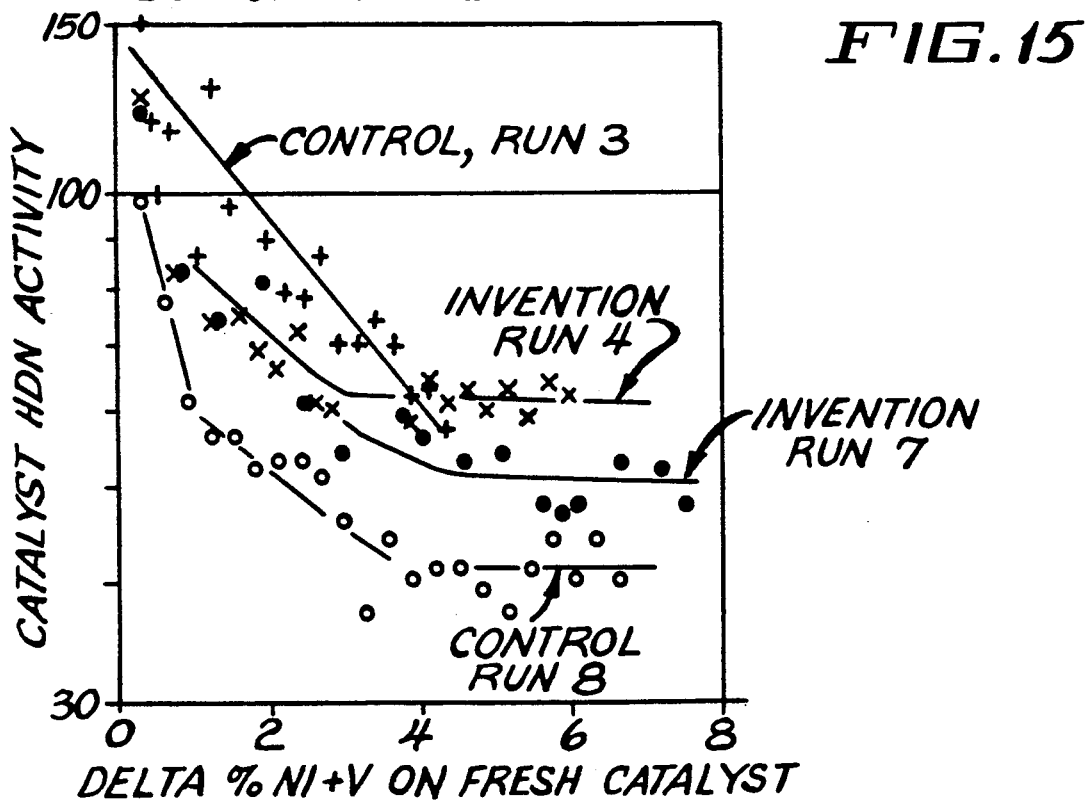
FIG. 15
EFFECT OF MIXTURE RATIO ON HDN

HYDROCONVERSION PROCESS USING MIXED CATALYST SYSTEM

BACKGROUND

This invention relates to a catalytic process for hydroconversion of heavy hydrocarbon streams containing asphaltenic material, metals, sulfur-containing compounds and nitrogen-containing compounds. More particularly, this invention relates to a hydroconversion process using a catalyst mixture having improved activity and activity maintenance in the desulfurization, demetallation and denitrogenation of heavy hydrocarbon streams, which produce insoluble carbonaceous substances also known as Shell hot filtration solids, dry sludge, and hexane insolubles.

While crude oil prices have declined since the sharp rises in 1973 and 1979 that spurred efforts to improve heavy hydrocarbon conversion, in the long-term it may become necessary to increasingly utilize heavy crudes due to a decreasing supply or availability of light oils. Thus, as refiners increase the proportion of heavier, poorer quality crude oil in the feedstock to be processed, the need grows for effective processes to treat the fractions containing increasingly higher levels of metals, asphaltenes, sulfur, and nitrogen It is widely known that various organo-metallic compounds and asphaltenes are present in petroleum crude oils and other heavy petroleum hydrocarbon streams, such as petroleum hydrocarbon residua and hydrocarbon streams derived from tar sands. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst will become deactivated rapidly and will be subject to premature replacement Although processes for the hydrotreating of heavy hydrocarbon streams, including but not limited to heavy crudes, reduced crudes, and petroleum hydrocarbon residua, are known, the use of fixed-bed catalytic processes to convert such feedstocks mostly to lighter products without appreciable asphaltene precipitation and reactor plugging and with effective removal of metals and other contaminants, such as sulfur compounds and nitrogen compounds, are not common because the catalysts employed have not generally been capable of maintaining activity and performance.

Thus, the subject hydrotreating processes are most effectively carried out in an ebullated bed system where a portion of the deactivated catalyst is replaced with fresh catalyst at a desired rate. In an ebullated bed, preheated hydrogen and resid enter the bottom of a reactor wherein the upward flow of resid plus internal liquid recycle suspend the catalyst particles in the liquid phase. Recent developments involved the use of a powdered catalyst which can be suspended without the need for a liquid recycle. In this system, part of the catalyst is continuously or intermittently removed in a series of cyclones and fresh catalyst is added to maintain activity Roughly about 1 wt. % of the catalyst inventory is replaced each day in an ebullated bed system. Thus, the overall system activity is the weighted average activity of catalyst varying from fresh to very old, i.e., deactivated.

The art discloses a multitude of catalyst systems suitable for upgrading heavy hydrocarbons. A majority of these processes are two-stage processes wherein the first-stage catalyst is effective in metals removal, asphaltene reduction and hydrocracking, whereas the second-stage catalyst is effective in hydrogenation reactions such as desulfurization, denitrogenation, reduction of Conradson carbon and saturation of aromatics. This same concept is employed in single fixed bed reactors where layers or zones of the various stage catalysts are situated in series. These two-stage catalyst processes are typically carried out by varying the catalytic metals, catalytic metals loadings, pore size distributions and support compositions of the catalyst employed in each stage, zone, or layer.

For instance, a paper entitled "Stacked Bed Hydrotreating Catalyst Technology" presented at the 1986 NPRA Annual Meeting March 23–25, 1986 (Charles T. Adams, Don M. Washecheck, Richard H. Stade, W. J. Daniels), discloses a first stage catalyst that contains nickel and molybdenum to enhance aromatics hydrogenation and a second stage catalyst that contains cobalt and molybdenum to enhance hydrodenitrogenation, thus employing a system where catalytic metals are varied.

There are numerous examples of the approach wherein pore size distributions are varied in the catalyst stages, especially where the upstream stage catalyst utilizes relatively larger pore sizes.

U.S. Pat. No. 4,830,736 (Hung et al.) discloses a "graded" system wherein a hydrodemetallation catalyst is composed of different types of catalysts with differing metals capacities and hydrogenation activities to provide gradual change through the catalyst system in the direction of the flow. Specifically, a process is disclosed wherein a first zone comprises catalyst particles having at least 10 volume percent of their pore volume above 1,000 Angstroms and a surface area ranging from about 50 $m^2/g$ to about 200 $m^2/g$ followed by a second zone that comprises catalyst particles having less than 20 volume percent of their pore volume in pores having a diameter of 1,000 Angstroms in diameter, an average mesopore diameter ranging from about 80 Angstroms to about 400 Angstroms and a surface area ranging from about 80 $m^2/g$ to about 300 $m^2/g$ U.S. Pat. No. 4,297,242 (Hensley et al.) discloses a multiple-stage catalytic process for hydrodemetallization and hydrodesulfurization of heavy hydrocarbon streams containing asphaltenes and a substantial amount of metals wherein the pore sizes of the catalysts in the respective stages are varied. The first stage of this process comprises contacting the feedstock in a first reaction zone with hydrogen and a demetallation catalyst comprising hydrogenation metal selected from Group VIB and/or Group VIII deposited on a large-pore, high surface area inorganic oxide support; the second stage of the process comprises contacting the effluent from the first reaction zone with a catalyst consisting essentially of hydrogenation metal selected from Group VIB deposited on a smaller pore, catalytically active support comprising alumina, said second stage catalyst having a surface area within the range of about 150 $m^2/gm$ to about 300 m²/gm, an average pore diameter within the range of about 90 Angstroms to about 160 Angstroms, and the catalyst has a pore volume within the range of about 0.5 cc/gm to about 0.9 cc/gm.

In U.S. Pat. No. 4,212,729 (Hensley et al.), another two-stage catalytic process for hydrodemetallization and hydrodesulfurization of heavy hydrocarbon streams containing asphaltenes and metals is disclosed. In this process, the first-stage demetallation catalyst comprises a metal selected from Group VIB and from Group VIII deposed on a large-pore, high surface area inorganic oxide support. The second stage catalyst contains a hydrogenation metal selected from Group VIB deposed on a smaller pore catalytically active support having the majority of its pore volume in pore diameters within the range of about 80 Angstroms to about 130 Angstroms.

U.S. Pat. No. 4,626,340 (Galiasso et al.) discloses a process for the conversion of heavy hydrocarbon feedstocks wherein the feedstock is passed to a hydrodemetallization zone having a bimodal catalyst, followed by a thermal cracking zone, and then followed by a hydrocarbon conversion zone containing a bimodal catalyst. The hydrodemetallization zone bimodal catalyst possesses a pore-distribution such that 20% of the pores are between 10 and 100 Angstroms and 60% of the pores are between 100 and 1,000 Angstroms. The hydrocarbon conversion zone bimodal catalyst possesses a pore size distribution such that 40% of the pores are between 10 and 100 Angstroms and 40% are between 100 and 1,000 Angstroms.

U.S. Pat. No. 4,016,067 (Fischer et al.) discloses another two-stage process for upgrading residual oil fractions. The first stage contains a catalyst having at least 60% of its pore volume in pores of 100 Angstroms and 200 Angstroms and at least about 5% of its pore volume in pores having a diameter greater than 500 Angstroms. The second-stage catalyst has a major fraction of its pores in the 30 to 100 Angstroms diameter range.

Similarly, U.S. Pat. No. 4,447,314 (Banta) also discloses a two-stage process for hydrotreating residual oil fractions. Specifically, the first-stage catalyst has at least 60% of its pore volume in pores with diameters of about 100 to 200 Angstroms, at least 5% of its pore volume in pores greater than 500 Angstroms, and a surface area up to about 110 ²/g. The second-stage catalyst has a surface area of at least 150 m²/g and 50% of its pore volume in pores with diameters of 30 to 100 Angstroms.

A contrary approach is disclosed in U.S. Pat. No. 4,789,462 (Byrnes et al.), where a "reverse-graded catalyst system" is disclosed. In particular, the process catalyst system comprises two or more catalyst layers in which at least two successive catalyst layers are characterized as having decreasing desulfurization activity and increasing average macropore diameter in the direction of hydrocarbon flow.

Yet another approach used by refiners to upgrade heavy hydrocarbons has been to use catalysts having bimodal pore size distributions in the entire reactor. A bimodal distribution means a pore distribution including two major peaks of pore diameters measured as a plot of pore volume in cc/g versus pore diameter or radius. Typically, the macropore peak occurs where the pores have diameters in excess of 1,000 Angstroms, whereas the smaller pore or mesopore peak occurs at pore sizes ranging from 100 to 200 Angstroms.

For instance, U.S. Pat. No. 4,707,466 (Beaton et al.) discloses a bimodal catalyst effective for the hydrodemetallization, hydrodesulfurization and hydrocracking of a hydrocarbon feedstock containing asphaltenes, metals, and Shell hot filtration solids precursors.

The prior art also discloses catalyst schemes wherein physical or mechanical mixtures of sets of catalysts having different catalytic metals loadings or pore size distributions are employed.

U.S. Pat. No. 4,353,791 (Pellet) discloses a coal liquefaction hydrotreating catalyst composition comprising particles of component A consisting essentially of at least one Group VIB metal component and component B consisting essentially of either a cobalt and/or a nickel component. Both component A particles and component B particles are supported on the same high surface area porous refractory inorganic oxide having a bimodal pore size distribution. The subject reference defines the smaller pores as ranging from 100 to 200 Angstroms in diameter with the larger pores generally ranging from 1,000 to 10,000 Angstroms.

Offenlegungsschrift, D. E. 3207554 A1 discloses a process for desulfurization and demetallization of oils using a mixture of two catalyst components having slightly differing pore size distributions. In particular, the subject reference discloses a first catalyst having an average pore diameter ranging from about 45 to about 75 Angstroms and a second catalyst having an average pore dtiameter ranging from about 85 to about 125 Angstroms wherein both the second and first catalyst have less than 5% of the total pore volume in pores having diameters greater than 500 Angstroms. Neither of the catalysts employed in the mixture include any appreciable macropore volume where macropores are generally defined as pores having a diameter greater than 1,000 Angstroms.

The catalysts disclosed in the above references generally contain hydrogenating components comprising one or more metals from Group VIB and/or Group VIII on a high surface area support such as alumina, and such combinations of metals as cobalt and molybdenum, nickel and molybdenum, nickel and tungsten, and cobalt, nickel, and molybdenum have been found useful. Generally, cobalt and molybdenum have been preferred metals in the catalysts disclosed for hydrotreatment of heavy hydrocarbon streams, both in first-stage catalytic treatment to primarily remove the bulk of the metal contaminants, and in second-stage catalytic treatment primarily for desulfurization.

The treatment of the heavy hydrocarbon streams, such as resids, described above, presents a myriad of difficulties for the refiner. Specifically, catalysts having the highest activity for denitrogenation and desulfurization also tend to deactivate rapidly. The rapid deactivation occurs because the high-activity catalysts typically have pores having relatively small average pore diameters, wherein the entrances or mouths to these pores are quickly blocked by the relatively large species present in heavy hydrocarbon streams, such as asphaltenes, organo-metallics, etc. For instance, catalysts having substantial surface area in pores having diameters less than about 200 Angstroms restrict organo-metallics and asphaltenes from the active sites in the pores because these species become diffusionally hindered, whereas smaller less refractory components diffuse unhindered.

On the other hand, catalysts having relatively large average pore diameters provide superior demetallization, asphaltene conversion and Shell hot filtration solids precursors conversion. For instance, catalysts having surface area in pores larger than 200 Angstroms permit deposition of metals and asphaltenes within such pores by virtue of the shorter diffusion path. Increases in pore diameter however mean a lower surface area which engenders a loss in catalytic activity.

In order to upgrade heavy hydrocarbons, the trade-offs set out above need to be resolved in a satisfactory manner. Thus as mentioned above, this dilemma has typically been addressed by using bimodal catalysts where the macropores serve as diffusing feeder channels for the large molecules or varying catalysts in series in the direction of hydrocarbon flow.

Another difficulty which arises in resid or heavy oil hydroprocessing units is the formation of insoluble carbonaceous substances also known as Shell hot filtration solids. These substances cause operability problems in the hydrotreating and downstream units. Certain resids tend to produce greater amounts of solids thereby limiting the level of upgrading by the amount of these solids the hydroprocessing unit can tolerate.

Further, the higher the conversion level for given feedstocks the greater the amount of solids formed. In high concentrations, these solids accumulate in lines and separators, causing fouling, and in some cases interruption or loss of process flow. The formation of these solids results in the agglomeration of the catalyst, thereby causing high pressure drops through fixed catalyst beds. In an ebullated bed type reactor, catalyst agglomeration can prevent proper mixing of the oil, hydrogen, and catalyst which allows uncontrolled reactions and local hot spots that can result in reactor failure, serious fires, or explosion.

To avoid these problems, refiners have taken several measures. Conversion has been limited to 40 to 70 volume or solids have been removed after a partial initial conversion of the feedstock prior to further conversion. Further, refiners have been limited in their choice of feedstocks by having to avoid the use of or limit the conversion of feedstocks that have a greater tendency to produce the subject solids.

Accordingly, it is a general object of the present invention to provide a process affording superior demetallization, desulfurization, hydrodenitrogenation, and hydroconversion of a hydrocarbon feedstock containing metals, sulfur, nitrogen, and Shell hot filtration solids precursors.

It is another general object of this invention to provide a process affording a higher conversion level for heavy hydrocarbon feedstocks that tend to form greater amounts of insoluble substances, especially that fraction of the feedstock that boils over 1,000° F.

Yet another object of the present invention is to provide a process that produces gas oil effluent streams that can be catalytically cracked to gasoline fractions at higher yield levels.

Another object of the present invention is to provide a process that produces effluent distillates having lower nitrogen and sulfur contents affording such distillates higher value in subsequent blending processes.

Another object of the present invention is to provide a process that provides greater liquid volume expansion of effluent fractions such as naphtha and distillate.

Surprisingly, it has been discovered that the above objects can be obtained when a physical or mechanical mixture of catalysts is used in accordance with the present invention wherein a first set of catalyst particles contains a prescribed maximum average pore diameter and a second set of catalyst particles contains a prescribed amount of macropore volume.

Specifically, by using a catalyst mixture in accordance with the present invention hydrocarbon streams containing metals, sulfur, nitrogen, asphaltenes and Shell hot filtration solid precursors can be upgraded with greatly reduced operability difficulties. By using a first relatively small-pore highly active catalyst mixed with a second catalyst having a large volume of macropore volume, the metals and asphaltenes preferentially deposit in the large pore catalyst, thereby permitting the more active small pore catalyst to upgrade smaller feed components without being deactivated by pore entrance blocking.

BRIEF DESCRIPTION OF THE DRAWINGS

FIGS. 11-13 are bar charts depicting analyses of spent catalysts, the nature of coke deposits on spent catalysts, and the percent of coke and metals deposited on spent catalysts, respectively, for a test run in accordance with the invention carried out in Example 2.

FIGS. 14A and 14B depict a vanadium profile of spent catalysts for a test run in accordance with the invention carried out in Example 2.

FIG. 15 is a plot of hydrodenitrogenation activity vs. % accumulation nickel plus vanadium on tested catalysts as the mixture ratio in the mixed catalyst system effects this activity. The test runs are described in Example 3.

SUMMARY OF THE INVENTION

Figure 1:
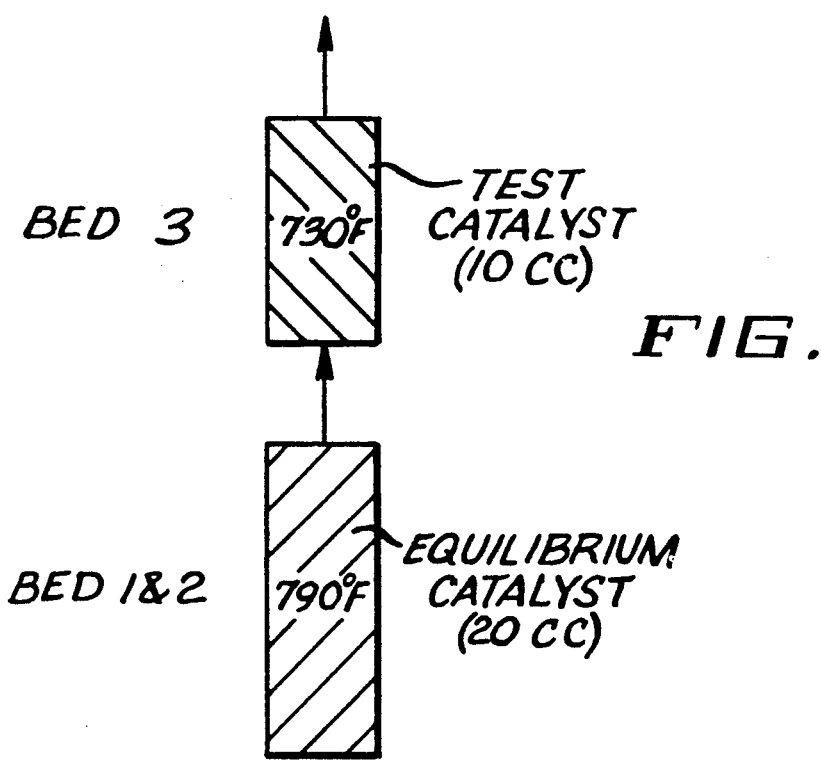
FIG. 1 is a schematic drawing of the reactor configuration used to test the process of the invention in Example 1.

This invention comprises a process for the hydrodemetallation, hydrodesulfurization, hydrodenitrogenation, and hydroconversion of a hydrocarbon feedstock containing asphaltenes, metals, sulfur, nitrogen, and Shell hot filtration solids precursors. More particularly, in the process of the invention, the hydrocarbon feedstock is contacted with hydrogen under conversion conditions in the presence of a catalyst mixture comprising a first catalyst composition comprising a porous refractory inorganic oxide wherein the first catalyst composition possesses a pore volume of less than about 0.10 cc/g in pores having a diameter greater than about 200 Angstroms, a pore volume of less than about 0.02 cc/g in pores having a diameter greater than about 800 Angstroms, and a maximum average mesopore diameter of about 130 Angstroms; and a second catalyst composition wherein, the second composition possesses a pore volume of greater than about 0.07 cc/g in pores having a diameter greater than 800 Angstroms. The first catalyst composition is present in an amount ranging from about 10 to about 90 vol. % based on the total amount of catalyst mixture.

The process of the invention converts at least 30 vol. % of the hydrocarbon feedstock fraction boiling above 1,000° F. to material boiling below 1,000° F. and preferably 60 vol. % to 90 vol. % of the material boiling above 1,000° F. to a material boiling below 1,000° F.

DETAILED DESCRIPTION OF THE INVENTION

Broadly, the present invention is directed to a process for the hydroconversion of heavy hydrocarbon feedstocks which contain asphaltenes, Shell hot filtration solids precursors, metals, nitrogen compounds, and sulfur compounds. As is well known these feedstocks contain nickel, vanadium, and asphaltenes, e.g., about 40 ppm up to more than 1,000 ppm for the combined total amount of nickel and vanadium and up to about 25 wt. % asphaltenes. This process is particularly useful in treating feedstocks with a substantial amount of metals containing 150 ppm or more of nickel and vanadium and having a sulfur content in the range of about 1 wt. % to about 10 wt. %. Typical feedstocks that can be treated satisfactorily by the process of the present invention contain a substantial amount of components that boil appreciably above 1,000° F. Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organo-metallic contaminants which create deleterious effects in various refining processes that employ catalysts in the conversion of the particular hydrocarbon stream being treated. The metallic contaminants found in such feedstocks include, but are not limited to, iron, vanadium, and nickel.

Nickel is present in the form of soluble organo-metallic compounds in most crude oils and residuum fractions. The presence of nickel porphyrin complexes and other organo-nickel complexes causes severe difficulties in the refining and utilization of heavy hydrocarbon fractions, even if the concentration of such complexes is relatively small. It is known that a cracking catalyst deteriorates rapidly and its selectivity changes when in the presence of an appreciable quantity of the organo-nickel compounds. An appreciable quantity of such organo-nickel compounds in feedstocks that are being hydrotreated or hydrocracked harmfully affects such processes. The catalyst becomes deactivated and plugging or increasing of the pressure drop in a fixed-bed reactor results from the deposition of nickel compounds in the interstices between catalyst particles.

Iron-containing compounds and vanadium-containing compounds are present in practically all crude oils that are associated with the high Conradson carbon asphaltenic and/or asphaltenic portion of the crude. Of course, such metals are concentrated in the residual bottoms, when a crude is topped to remove those fractions that boil below about 450° F. to 600° F. If such residuum is treated by additional processes such as fluidized catalytic cracking, the presence of such metals as well as sulfur and nitrogen adversely affects the catalysts in such processes. It should be pointed out that the nickel-containing compounds deleteriously affect cracking catalysts to a greater extent than do iron-containing compounds. If an oil containing such metals is used as a fuel, the metals will cause poor fuel oil performance in industrial furnaces since they corrode the metal surfaces of the furnaces.

While metallic contaminants, such as vanadium, nickel, and iron, are often present in various hydrocarbon streams, other metals are also present in a particular hydrocarbon stream. Such metals exist as the oxides or sulfides of the particular metal, or as a soluble salt of the particular metal, or as high molecular weight organo-metallic compounds, including metal naphthenates and metal porphyrins, and derivatives thereof.

Another problem associated with the hydroconversion of heavy hydrocarbons is the formation of insoluble carbonaceous substances from the asphaltenic and/or resin fraction of the feedstock which cause operability problems. The amount of such insolubles formed increases with the amount of material boiling over 1,000° F. which is converted or with an increase in the reaction temperature employed. These insoluble substances, also known as Shell hot filtration solids, create the operability difficulties for the hydroconversion unit, and thereby circumscribe the temperatures and feeds the unit can handle. In other words, the amount of solids formed limit the conversion of a given feedstock. Operability difficulties as described above begin to manifest themselves when the solids levels reach about the 1.0 to 1.3 wt. % level. Levels below 1.0 wt. % are generally recommended to prevent fouling of process equipment. The Shell hot filtration solids test is set out in the Journal of the Inst. of Petroleum (1951) 37 pp. 596–604, by Van Kerkuoort, W. J. and Nieuwstad, A. J. J., which is incorporated herein by reference.

Although the present invention is in no way limited to the following speculative mechanism, it is believed that such insoluble carbonaceous substances are formed when the heavy hydrocarbons are converted more rapidly in the hydroconversion unit to lower molecular weight oils thereby rendering them a poorer solvent for the unconverted asphaltenic fraction and hence creating the insoluble carbonaceous substances.

The process of the present invention permits a decrease in the formation of the above-described insolubles or Shell hot filtration solids by permitting the preferential deposition and conversion of these species in the second catalyst composition having a high macropore volume in the catalyst mixture. Also, the large pores in the second catalyst facilitate deposition of nickel and vanadium in the catalyst. The second large pore catalyst effects the above preferential depositions in a much greater amount than would be expected based the arithmetic volume amount of the second catalyst present in the mixture.

The process of the present invention serves to reduce Shell hot filtration solids formation, and thereby increase operability while simultaneously permitting the conversion of heavy hydrocarbons which are prone to produce large amounts of Shell hot filtration solids and avoiding an unacceptably high catalyst addition rate.

The present invention can be carried out in a fixed bed reactor or series of fixed bed reactors. In a preferred mode, the present invention is carried out in one or a series of ebullated bed reactors. As previously elucidated, an ebullated is one in which the solid catalyst particles are kept in random motion by the upward flow of liquid and gas. An ebullated bed typically has a gross volume of at least 10 percent greater and up to 70% greater than the solids thereof in a settled state. The required ebullation of the catalyst particles is maintained by introducing the liquid feed, inclusive of recycle if any to the reaction zone at linear velocities ranging from about 0.02 to about 0.4 feet per second and preferably, from about 0.05 to about 0.20 feet per second.

In a broad embodiment of the present invention, the process for hydrodemetallation, hydrodesulfurization, hydrodenitrogenation, and hydroconversion of the hydrocarbon feedstock is carried out in the presence of a catalyst mixture comprising a first catalyst composition having relatively small pores and a second catalyst composition having relatively large pores. The first catalyst composition comprises a porous refractory inorganic oxide and possesses a pore volume of less than about 0.10 cc/g in pores having a diameter greater than about 200 Angstroms, a pore volume of less than about 0.02 cc/g in pores having a diameter greater than about 800 Angstroms, and a maximum average mesopore diameter of about 130 Angstroms. Mesopores are broadly defined as pores having diameters ranging from about 50 Angstroms to about 300 Angstroms. The second catalyst composition comprises a porous refractory inorganic oxide and possesses a pore volume of greater than about 0.07 cc/g in pores having a diameter greater than 800 Angstroms.

In the present broad embodiment of the invention, the second catalyst can be unimodal or bimodal provided it has the requisite amount of macropore volume. The first catalyst is essentially unimodal since it has no appreciable macropore volume.

In a preferred embodiment of the present invention, the first catalyst possesses an average mesopore diameter ranging from about 60 to about 120 Angstroms coupled with the above-described first catalyts pore volume constraints. The second catalyst contains an average mesopore diameter ranging from about 60 to about 200 Angstroms coupled with a macropore volume of greater than about 0.1 cc/g in pores having diameters greater than about 800 Angstroms.

In a most preferred embodiment of the present invention, the first catalyst possesses an average mesopore diameter of about 80 to about 100 Angstroms, a pore volume of less than about 0.05 cc/g in pores having diameters greater than about 200 Angstroms, and a pore volume of less than about 0.02 cc/g in pores having a diameter greater than about 800 Angstroms. The second catalyst has an average mesopore diameter of about 150 to about 180 Angstroms and a macropore volume of greater than about 0.1 cc/g in pores having a diameter greater than about 1200 Angstroms. In all of the above embodiments, the average mesopore pore volume was calculated by the BJH method based on nitrogen desorption measurements and the macropore volume was calculated as intrusion volume based on mercury porosimetry measurements.

Further, in all of the above embodiments, the first catalyst is present in an amount ranging from about 10 to about 90 vol. %, preferably about 20 to about 80 vol. % and most preferably about 50 to about 70 vol. % based on the total amount of catalyst mixture.

The catalysts in the catalyst mixture of the present invention preferably contain at least one hydrogenation component. Preferred hydrogenation components are selected from the group consisting of Group V, VIB, and VIII metals.

The addition of a Group VIII metal to the catalyst of the catalyst mixture of the invention process is especially useful when ebullated bed reactors are employed. In a fixed bed reactor the activity of the catalyst dissipates over time, whereas in the ebullated bed reactor, since fresh amounts of catalyst are continuously or intermittently added, the Group VIII metal provides increased overall average activity since the presence of a Group VIII promoter provides a higher initial activity than the catalyst not containing such a promoter. The freshly added higher initial activity catalyst is included in the weighted average used to determine overall average activity. It has been discovered that relatively small amounts of cobalt present in a hydroconversion catalyst provide excellent hydroconversion activity in an ebullated bed system. The relatively small amount of cobalt can be used on either the first small pore catalyst and/or the second high macropore volume catalyst of the catalyst mixture of the present invention.

A preferred second catalyst useful in accordance with the present invention is disclosed in U.S. Pat. No. 4,707,466 (Beaton et al.). This low cobalt-containing catalyst also has a group VIB metal present in an amount ranging from about 3.5 to about 5.0 wt. % calculated as an oxide and based on total catalyst weight. The cobalt is present in an amount ranging from about 0.4 to about 0.8 wt. % calculated as an oxide (CoO) and based on total catalyst weight.

In any event, the hydrogenation metals can be deposed on a porous inorganic oxide support such as alumina, aluminum phosphate, aluminum silicates, and the like, which are suitable for both the first and second catalyst in accordance with the present invention. Both or either of the first and second catalyst compositions of the hydroconversion catalyst mixture of the present invention can comprise from about 3.0 to about 22.0 wt. % of the Group VIB metal, calculated as the oxide. Preferably the Group VIB metal is molybdenum present as a $MoO_3$ in the preferred amount ranging from about 0.75 to about 3.25 wt. % $MoO_3$ per 30 m/g of BET surface area present in the catalyst of the invention. The Group VIB and Group VIII classifications of the Periodic Table of Elements can be found on page 628 of Webster's Seventh New Collegiate Dictionary, G. & C. Merriam Company, Springfield, Massachusetts, U.S.A. (1965). While calculated as the oxide, the hydrogenation metal components of the catalyst can be present as the element, as an oxide thereof, as a sulfide thereof, or mixtures thereof. Molybdenum, which is generally superior than tungsten in demetallation and desulfurization activity as mentioned above, is the preferred Group VIB metal component.

The Group VIII metal can be present in either or both of the catalysts of the invention mixture in an amount ranging from about 0.4 to about 8.0 wt. % calculated as an oxide and based on total catalyst weight of either the first catalyst composition or the second catalyst composition. The preferred Group VIII metals are cobalt and nickel. The cobalt and nickel are preferably present in an amount such that the CoO or NiO to Group VIB metal oxide weight ratio varies from about 0.1 to about 0.3.

The Group V metal can be present in either or both of the catalysts of the invention mixture in an amount ranging from about 0.1 to about 10 wt. %, preferably about 0.5 to about 5.0 wt. % calculated as the oxide and based on the total weight of the catalyst in which it is present. The preferred Group V metal is phosphorus.

The hydroconversion catalysts used in the catalyst mixture of the process of the present invention can be prepared by the typical commercial method of impregnating a inorganic oxide support or any other method known to those skilled in the art. The pore volume distributions required for the second and first catalysts can be achieved by any methods of preparation readily available to those skilled in the art. Appropriate commercially available alumina, preferably calcined at about 800°–1,600° F. (426°–872° C.), for about 0.5 to about 10 hours, can be impregnated to provide the suitable surface area and pore volume range characteristics for the first small pore catalyst composition and the second large pore catalyst composition of the catalyst mixture of the invention.

The porous refractory inorganic oxide, e.g., alumina can be impregnated with a solution, usually aqueous, containing a heat-decomposable compound of the metal to be placed on the catalyst, drying, and calcining the impregnated material. If the impregnation is to be performed with more than one solution, it is understood that the metals may be applied in any order. The drying can be conducted in air at a temperature of about 80° F. (27° C.) to about 350° F. (177° C.) for a period of 1 to 50 hours. Typically, the calcination can be carried out at a temperature of about 800° F. (426° C.) to about 1,200° F. (648° C.) for a period of from 0.5 to 16 hours.

Alternatively, the inorganic oxide support can be prepared by mixing a sol, hydrosol, or hydrogel of the inorganic oxide with a gelling medium, such as ammonium hydroxide followed by constant stirring to produce a gel which is subsequently dried, pelleted, or extruded, and calcined. The hydrogenation metal(s) can then be incorporated into the support as described above or incorporated during the gelling step.

While the hydroconversion catalysts of the mixture used in the present invention can be present in the form of pellets, spheres, or extrudates, other shapes are also contemplated, such as a clover-leaf shape, cross-shape cylinder, or C-shape as disclosed in U.S. Pat. Nos. 3,674,680 and 3,764,565 (Hoekstra, et al.).

The operating conditions for the hydroconversion of heavy hydrocarbon streams, such as petroleum hydrocarbon residua and the like, comprise a hydrogen partial pressure within the range of about 1,000 psia (68 atmos) to about 3,000 psia (204 atmos) and above, an average catalyst bed temperature within the range of about 700° F. (371° C.) to about 850° F. (454° C.), a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 2,000 standard cubic feet per barrel (SCFB) (356 $m^3/m^3$) to about 15,000 SCFB (2,671 $m^3/m^3$). Preferably, the operating conditions comprise a hydrogen partial pressure within the range of about 1,200 psia to about 2,800 psia (81–136 atmos); an average catalyst bed temperature within the range of about 730° F. (387° C.) to about 820° F. (437° C.); and a LHSV within the range of about 0.15 to about 2; and a hydrogen recycle rate or hydrogen addition rate within the range of about 2,500 SCFB (445 $m^3/m^3$) to about 5,000 SCFB (890 $m^3/m^3$).

If the process of the present invention were to be used to treat hydrocarbon distillates, the operating conditions would comprise a hydrogen partial pressure within the range of about 200 psia (13 atmos) to about 3,000 psia (204 atmos); an average catalyst bed temperature within the range of about 600° F. (315° C.) to about 800° F. (426° C.); a LHSV within the range of about 0.4 volume of hydrocarbon per hour per volume of catalyst to about 6 volumes of hydrocarbon recycle rate or hydrogen addition rate within the range of about 1,000 SCFB (178 $m^3/m^3$) to about 10,000 SCFB (1,381 $m^3/m^3$). Preferred operating conditions for the hydrotreating of hydrocarbon distillates comprise a hydrogen partial pressure within the range of about 200 psia (13 atmos) to about 1,200 psia (81 atmos); an average catalyst bed temperature within the range of about 600° F. (315° C.) to about 750° F. (398° C.); a LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 $m^3/m^3$) to about 6,000 SCFB (1,068 $m^3/m^3$). Generally, the process temperatures and space velocities are selected so that at least 30 vol. % of the feed fraction boiling above 1,000° F. is converted to a product boiling below 1,000° F. and more preferably so that at least 60 vol. % of the subject fraction is converted to a product boiling below 1,000° F.

EXAMPLE 1

The present example serves to show the improvement afforded by the process of the invention over prior art hydrotreating processes.

Several test runs as described below were carried out in two fixed-bed, upflow reactors operated in series wherein the upstream reactor had two catalyst beds designated as beds 1 and 2 and wherein the downstream tail reactor had a single catalyst bed designated as bed 3.

In each test run, including both invention and comparative test runs, both beds 1 and 2 were loaded with equilibrium catalyst withdrawn from a commercial resid hydrotreating unit. The average age of the withdrawn catalyst was 150 days exposure to oil. The composition and physical properties of this equilibrium catalyst is set out below in Table I.

TABLE I

| EQUILIBRIUM CATALYST INSPECTION | | |
|---|---|---|
| Chemical Analyses | Wt % Spent Basis | Wt % Fresh Basis, Al-Tie Point |
| MoO₃ | 8.7 | 15.1 |
| CoO | 2.0 | 3.48 |
| Ni | 0.92 | 1.60 |
| V | 3.35 | 5.90 |
| Fe | 0.62 | 1.08 |
| C | 31.03 | 54.13 |
| H | 1.89 | 3.29 |
| S | 4.8 | 8.37 |
| N | 0.73 | 1.27 |
| Al | 25.0 | 43.6 |
| Physical Properties (Spent Basis) | | |
| N₂ Desorption | | |
| BET, m²/g | 10.6 | |
| 1,200 Å−, PV, cc/g | 0.04 | |
| Hg Porosimetry | 0.124 | |
| 1,200 Å+, PV, cc/g | | |
| Avg Pore Diam, 4V/A, Å | 620 | |

Four runs were carried out wherein the catalyst in the third bed was varied in runs 1 through 3 with comparative resid hydrotreating catalysts as set out in Table II below. Run 4 employed a catalyst mixture in accordance with the present invention as set out in Table II below. Specifically, in Run 4, reactor bed 3 was loaded with a mixture of catalyst B and C wherein catalyst B was the high macropore catalyst and catalyst C was the small pore size catalyst. The mixture in bed 3 contained 70 vol % (85 wt. %) small pore catalyst C and 30 vol % (15 wt. %) high macropore volume catalyst B.

TABLE II

| COMPARATIVE FRESH CATALYST INSPECTIONS - BED 3 | | | | |
|---|---|---|---|---|
| Catalyst: | A | B | C | D |
| Appearance: | Blue, 1/20" Cyl | Green, 1/20" Cyl | Green, 1/20" Trilobe | White 1/20" Cyl |
| Chemical Analyses (wt %, Ashed Oxide) | | | | |
| CoO | 0.57 | — | — | — |
| MoO₃ | 4.2 | 11.8 | 21.8 | 10.0¹ |
| NiO | — | 2.6 | 2.7 | — |
| P | — | 1.8 | 3.1 | — |
| Na | 0.009 | 0.038 | 0.041 | — |
| SiO₂ | 0.029 | 1.85 | — | — |
| SO₄ | 0.01 | 0.28 | — | — |
| Physical Properties | | | | |
| N₂ Desorption | | | | |
| BET, m²/g | 191 | 160 | 199 | 183 |
| 1,200 Å−, PV, cc/g BJH Style | 0.875 | 0.584 | 0.448 | 0.650 |
| Hg Porosimetry | | | | |
| 1,200 Å+, PV, cc/g | 0.317 | 0.31 | 0.010 | 0.328 |
| 800 Å+, PV, cc/g | 0.32 | 0.325 | 0.010 | 0.350 |
| Avg. Mesopore Diam, 4V/A, Å | 170 | 123 | 90 | 142 |

¹Nominal

FIG. 1 schematically depicts the reactor configuration and bed temperatures employed in the test runs carried out in the present example.

Commercial vacuum resid feedstock was processed at 2,000 psig, an overall space velocity of 0.2 LHSV, and once-through hydrogen addition rate of 9,000 SCFB. Product obtained at "lined out" conditions was vacuum distilled into naphtha, distillate, gas oil, and vacuum resid fractions. Mass balances were conducted periodically with recoveries averaging 95–102%.

All catalysts in Beds 1, 2, and 3 in all of the test runs were diluted with equal volumes of 14/20 mesh alpha-alumina chips prior to reactor loading. The thermal-to-catalytic ratio of the two-reactor system was approximately one. The thermal-to-catalytic ratio is calculated for a particular reactor as the following quotient. In particular the numerator is the total internal volume in the thermal zone of a reactor minus the settled volume of the catalyst charge (i.e., catalyst plus diluent) plus the interstitial liquid volume between particles in the catalyst charge present in the reactor plus the liquid volume in the catalyst pores. The denominator is the settled volume of the catalyst itself in the catalyst charge. The test runs typically lasted three to four weeks and deposited up to 2 wt %. nickel plus vanadium on the third bed catalyst.

The feedstock employed in all test runs of the present example possessed the properties set out below in Table III and is designated as feedstock A.

TABLE III

| FEED INSPECTIONS | | |
|---|---|---|
| | A | B |
| Total Liquid | | |
| API | 6.9 | 7.3 |
| 100° F.+, wt % | 85.7 | 71.2 |
| 650–1000° F., wt % | 14.3 | 28.8 |
| Ni, ppm | 68 | 112 |

TABLE III-continued
FEED INSPECTIONS

|  | A | B |
|---|---|---|
| V, ppm | 288 | 450 |
| Fe, ppm | 20 | — |
| S, wt % | 4.8 | 3.75 |
| N, wt % | 0.504 | 0.62 |
| O, wt % | 0.61 | — |
| C, wt % | 83.91 | 84.40 |
| H, wt % | 10.26 | 10.36 |
| Ramscarbon, wt % | 19.6 | 15.0 |
| NMR-$C_A$, atom % | 30.6 | — |
| 1000° F.+ |  |  |
| API | 4.0 |  |
| Ni, ppm | 76 |  |
| V, ppm | 319 |  |
| Fe, ppm | 18 |  |
| S, wt % | 5.1 |  |
| N, wt % | 0.620 |  |
| O, wt % | 0.65 |  |
| Ramscarbon, wt % | 22.0 |  |
| NMR-$C_A$, atom % | — |  |
| Oils, wt % | 21.4 |  |
| Resins, wt % | 62.8 |  |
| Asphaltenes, wt % | 14.8 |  |

Table IV below sets out a summary of each of the test runs along with the process conditions used in each run.

TABLE IV
SUMMARY OF TEST RUNS
2,000 psig, 0.2 LHSV Overall, 9,000 SCFB $H_2$

| Run No. | Beds 1 and 2 (20 cc) Catalyst | T(°F.) |
|---|---|---|
| 1 | Equilibrium Catalyst (Table I) | 790 |
| 2 | Equilibrium Catalyst (Table I) | 790 |
| 3 | Equilibrium Catalyst (Table I) | 790 |
| 4 (Invention) | Equilibrium Catalyst (Table I) | 790 |

| Run No. | Bed 3 (10 cc) Catalyst | T(°F.) | 1000° F.+ Conversion (wt % Feed) |
|---|---|---|---|
| 1 | A Table II | 730 | 65 |
| 2 | B Table II | 730 | 68 |
| 3 | C Table II | 730 | 67 |
| 4 | Invention Mixtures of Catalysts B and C | 730 | 67 |

Figure 2:
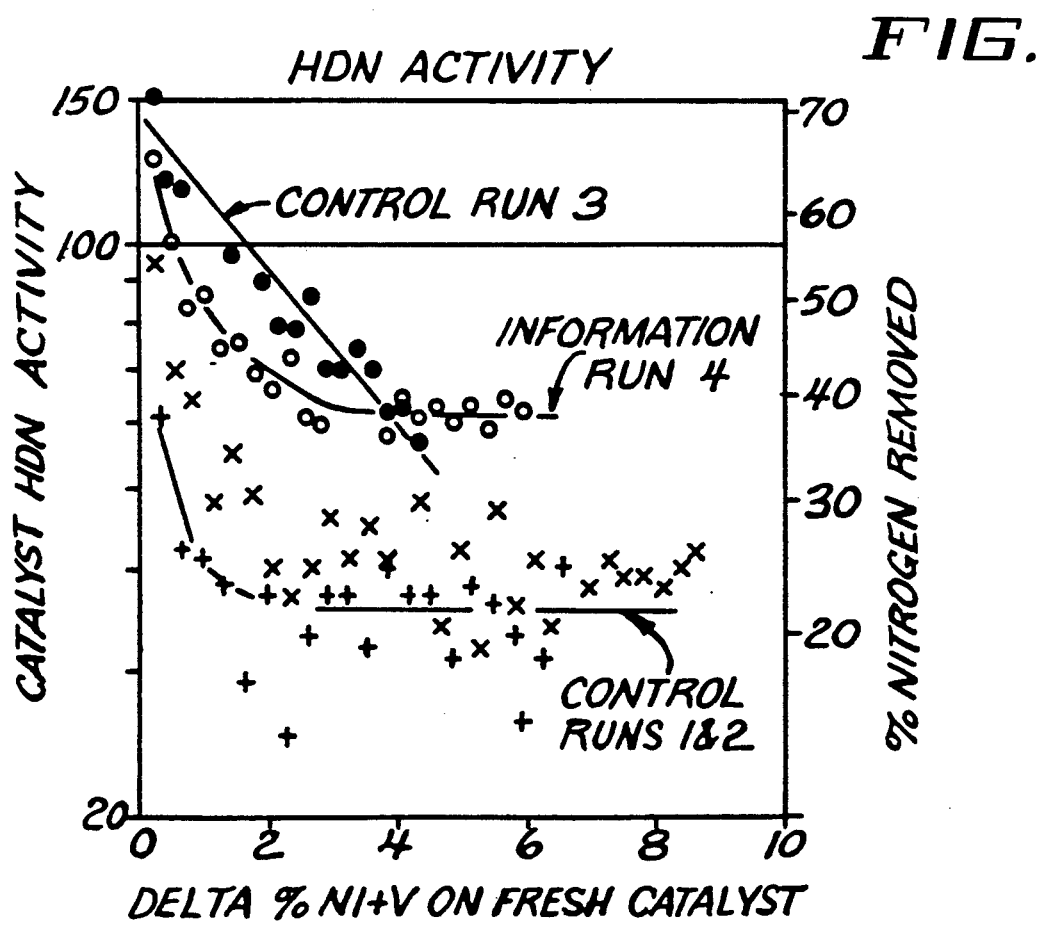
FIG. 2 is a plot of hydrodenitrogenation activity vs. % accumulation nickel plus vanadium on catalysts tested in Example 1.

FIG. 2 depicts a plot of denitrogenation activity versus percent nickel plus vanadium deposited on the catalyst in beds 1 through 3 for the comparative runs 1 through 3 and run 4 in accordance with the process of the invention. Denitrogenation activity was calculated assuming pseudo-first-order kinetics with an activation energy of 45,400 Btu/lb-mol in accordance with the following equation:

$$A_N = \frac{-\left\{\ln\left(\frac{N_p \times .93}{N_F}\right)\right\} \times LHSV}{K_N \times P \times (e^{-E/RT})}$$

where:

$A_{lN}$ is HDN activity
$N_F$ is feed nitrogen content, ppm
$N_P$ is product nitrogen content, ppm
LHSV is liquid (volumetric) hourly space velocity, $hr^{-1}$ $k_N$ is pre-exponential feed nitrogen factor = 92 $hr^{-1}$ $psig^{-1}$
P is total pressure, psig
E is activation energy 45,400 Btu/lb-mol
T is absolute kinetic average temperature, °R, or $$\frac{-E}{R \ln[(1/3)e^{-E/RT_1} + (1/3)e^{-E/RT_2} + (1/3)e^{-E/RT_3}]}$$

where:
$T_1$, $T_2$, $T_3$ are absolute temperatures in beds 1, 2, 3
E is activation energy based on desulfurization, 83,300 Btu/lb-mol It is readily evident that invention run 4 provided the best steady state denitrogenation activity. The run in accordance with the invention displayed a nitrogen removal rate of about 40% compared to run 1 which had about 20 to 25% nitrogen removal. Comparative run 3 using small pore catalyst C had the highest initial denitrogenation activity; however, the run had to be terminated after about 20 days on stream because of restricted flow through the reactor. It is believed that the relatively small pore sizes present in catalyst C accounted for this plugging problem.

Figure 3:
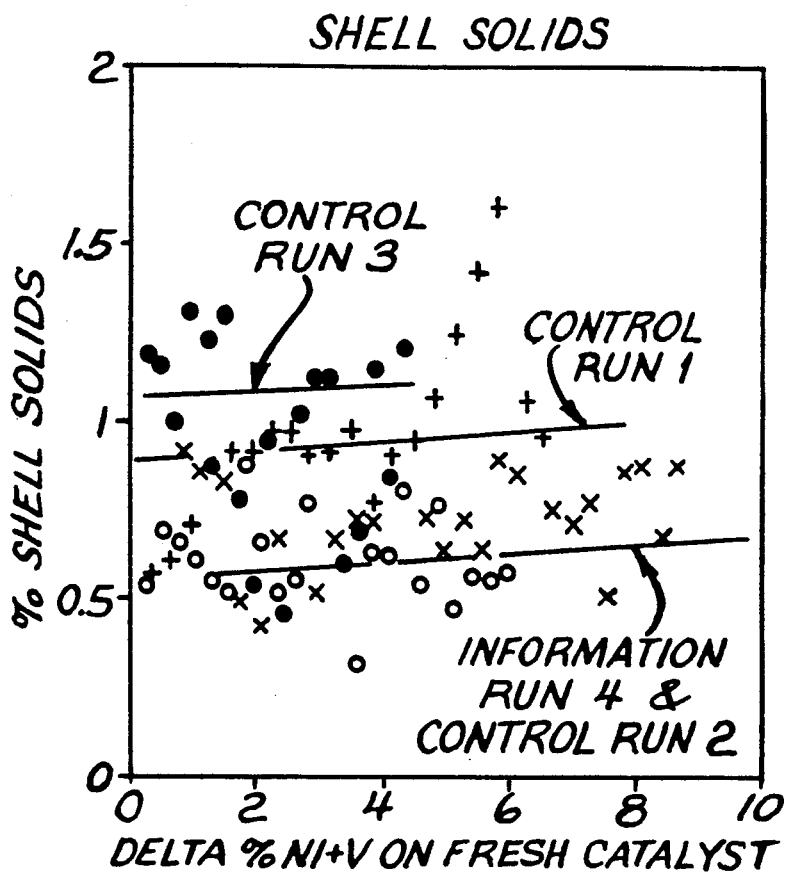
FIG. 3 is a plot of percentage Shell hot filtration solids vs. % accumulation nickel plus vanadium on catalysts tested in Example 1.

FIG. 3 depicts a plot of percentage Shell hot filtration solids in the reactor effluent versus percent nickel and vanadium accumulation on the catalyst in beds 1 through 3 for each run. The percentage of solids is an indication of the reactor's operability. The process of the invention displayed excellent operability characteristics with the relatively low production of solids in the 0.5 to 0.7 wt. % range. Comparative runs 1 and 3 displayed marginal to poor operability characteristics with solids averaging near or above 1.0 wt. %.

Figure 4:
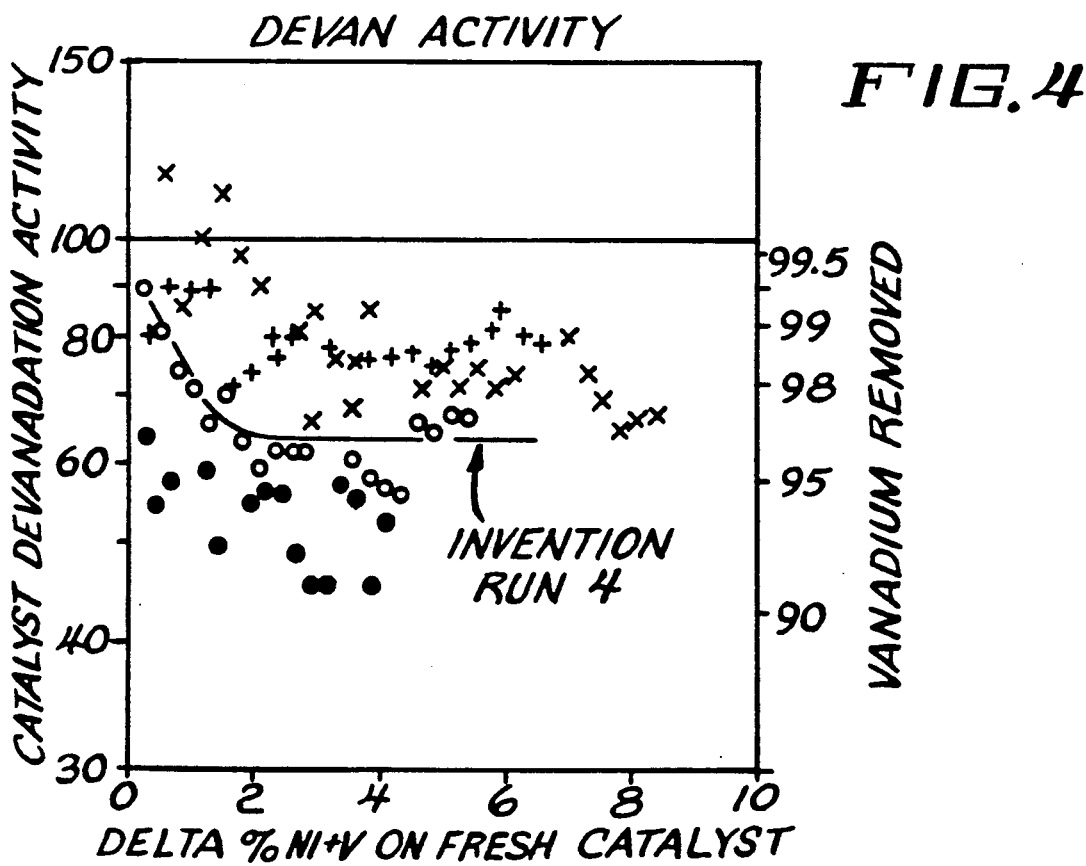
FIG. 4 is a plot of devanadation activity vs. % accumulation nickel plus vanadium on catalysts tested in Example 1.

FIG. 4 depicts a plot of devanadation activity for the test runs versus the percent accumulation of nickel plus vanadium deposited on the catalyst in beds 1 through 3.

Devanadation activity was calculated on the basis of the following first-order rate equation, where the activation energy was 83,300 Btu/lb-mol:

$$A_v = \frac{-\left\{\ln\left(\frac{V_P \times .93}{V_F}\right)\right\} \times LHSV}{K_v \times P \times (e^{-E/RT})}$$

where
$A_v$ is devanadation activity
$V_P$ is product vanadium content, ppm
$V_F$ is feed vanadium content, ppm
$K_v$ is pre-exponential feed vanadium factor ($2730 \times 10^6$ $hr^{-1}$ $psig^{-1}$)
P is total pressure, psig
T is absolute kinetic average temperature, °R, defined previously
E is activation energy, 83,300 Btu/lb-mol
LHSV is liquid (volumetric) hourly space velocity, $hr^{-1}$ Comparative Run 3 manifested the lowest devanadation activity probably due to the relative lack of macropores present in catalyst C. Runs 1 and 2 employing bimodal catalysts A and B, respectively, achieved the highest devanadation activity.

The difference in devanadation between the best and worst test runs, however, was only 97% versus 90 % vanadium removal from the feedstock, therefore the process of the invention still provides for an acceptable devanadation rate.

Table V below shows that the product quality in all boiling ranges is significantly improved for invention Run 4, compared to comparative run 1. At 65% conversion of 1,000° F. material to 1,000° F. minus material, nitrogen content was reduced by 60% in the naphtha and distillate fractions and by 25% in the gas oil and vacuum resid fractions when using the invention catalyst mixture in the third bed compared to run 1 not employing the catalyst mixture of the present invention. These lower nitrogen contents could favorably impact any distillate instability problems, as well as improve the hydroprocessability of gas oil sent to fluidized catalytic cracking unit feed hydrotreaters. A comparison of the sulfur analyses shows a similar but less dramatic trend. Metals content in the vacuum resid product fraction is up to 50% higher for the invention run.

TABLE V

COMPARISON OF PRODUCT QUALITY INVENTION RUN VS. RUN 1

Invention Run 4

| | Sim Dist Corrected Yield (Wt % Feed) | API | N (ppm) | S (wt %) |
|---|---|---|---|---|
| $H_2S$ | 4.4 | — | | |
| $C_1$-$C_4$ | 1.9 | — | | |
| IBP-360° F. | 7.8 | 58.3 | 113 | 0.057 |
| 360-650° F. | 23.2 | 34.5 | 652 | 0.041 |
| 650-1000° F. | 35.3 | 19.7 | 2,550 | 0.490 |
| 1000° F.+ | 28.5 | 6.5 | 5,640 | 1.40 |
| Total Calc | 101.1 | 22.9 | 2,740 | 0.60 |
| Meas (TLP) | | (22.9) | (3,070) | (0.74) |

| | Mass Spec (Vol %) | | | NMR |
|---|---|---|---|---|
| | Total Arom | Mono | Di | Tri+ | $C_A$ (Atom %) |
| $H_2S$ | — | | | | |
| $C_1$-$C_4$ | — | | | | |
| IBP-360° F. | 11.7 | 11.4 | 0.3 | 0 | |
| 360-650° F. | 36.3 | 31.2 | 4.0 | 0.3 | |
| 650-1000° F. | 48.6 | 20.5 | 9.5 | 9.3 | |
| 1000° F.+ | — | — | — | — | 37.2 |
| Total Calc | | | | | |
| Meas (TLP) | | | | | |

| | Ni (ppm) | V (ppm) | Fe (ppm) | Rams (wt %) |
|---|---|---|---|---|
| $H_2S$ | | | | |
| $C_1$-$C_4$ | | | | |
| IBP-360° F. | | | | |
| 360-650° F. | | | | |
| 650-1000° F. | | | | |
| 1000° F.+ | 34 | 30 | 2 | 24.1 |
| Total Calc | 9 | 8 | <2 | 6.43 |
| Meas (TLP) | (11) | (10) | (<2) | (7.00) |

| | Sim Dist (Wt % Off Over $T_1$-$T_2$) | Liq Dist Yield (wt %) |
|---|---|---|
| $H_2S$ | — | — |
| $C_1$-$C_4$ | — | — |
| IBP-360° F. | 0-90.5 | 8.1 |
| 360-650° F. | 4.0-97.5 | 22.3 |
| 650-1000° F. | 6.0-92.5 | 42.4 |
| 1000° F.+ | — | 26.7 |
| Total Calc | | 99.5 |

Comparative Run 1

| | Sim Dist Corrected Yield (Wt % Feed) | API | N (ppm) | S (wt %) |
|---|---|---|---|---|
| $H_2S$ | 4.2 | — | | |
| $C_1$-$C_4$ | 3.0 | — | | |
| IBP-360° F. | 5.1 | 56.6 | 317 | 0.036 |
| 360-650° F. | 20.0 | 33.6 | 1,550 | 0.115 |
| 650-1000° F. | 38.9 | 19.3 | 3,350 | 0.740 |
| 1000° F.+ | 29.8 | 4.6 | 7,450 | 1.67 |
| Total Calc | 101.0 | 20.0 | 3,940 | 0.831 |
| Meas (TLP) | (20.7) | (4,000) | (0.86) | |

| | Mass Spec (Vol %) | | | NMR |
|---|---|---|---|---|
| | Total Arom | Mono | Di | Tri+ | $C_A$ (Atom %) |
| $H_2S$ | — | | | | |
| $C_1$-$C_4$ | — | | | | |
| IBP-360° F. | 13.8 | 13.2 | 0.4 | 0 | |
| 360-650° F. | 35.8 | 28.5 | 5.6 | 0.4 | |
| 650-1000° F. | 50.7 | 20.7 | 10.3 | 9.9 | |
| 1000° F.+ | — | — | — | — | 39.6 |
| Total Calc | | | | | |
| Meas (TLP) | | | | | |

| | Ni (ppm) | V (ppm) | Fe (ppm) | Rams (wt %) |
|---|---|---|---|---|
| $H_2S$ | | | | |
| $C_1$-$C_4$ | | | | |
| IBP-360° F. | | | | |
| 360-650° F. | | | | |
| 650-1000° F. | | | | |
| 1000° F.+ | 56 | 11 | <2 | 25.3 |
| Total Calc | 15 | 3 | <2 | 7.00 |
| Meas (TLP) | (15) | (6) | (<2) | (7.90) |

| | Sim Dist (Wt % Off Over $T_1$-$T_2$) | Liq Dist Yield (wt %) |
|---|---|---|
| $H_2S$ | — | — |
| $C_1$-$C_4$ | — | — |
| IBP-360° F. | 0-93.0 | 5.4 |
| 360-650° F. | 20-96.0 | 19.9 |
| 650-1000° F. | 4.5-91.5 | 46.6 |
| 1000° F.+ | — | 27.6 |
| Total Calc | | 99.5 |

| | Sim Dist Corrected Yield (Wt % Feed) | API | N (ppm) | S (wt %) |
|---|---|---|---|---|
| Feed (FHC-571) | | | | |
| 650-1000° F. | 14.3 | 17.3 | 1,620 | 2.99 |
| 1000° F.+ | 85.7 | 4.0 | 6,200 | 5.1 |
| Total | 100.0 | 6.9 | 5,040 | 4.8 |

| | Mass Spec (Vol %) | | | NMR |
|---|---|---|---|---|
| | Total Arom | Mono | Di | Tri+ | $C_A$ (Atom %) |
| $H_2S$ | | | | | |
| $C_1$-$C_4$ | | | | | |
| IBP-360° F. | | | | | |
| 360-650° F. | | | | | |
| 650-1000° F. | | | | | |
| 1000° F.+ | | | | | 30.6 |
| Total | | | | | |

| | Ni (ppm) | V (ppm) | Fe (ppm) | Rams (wt %) |
|---|---|---|---|---|
| 650-1000° F. | <2 | <2 | <2 | 0.37 |
| 1000° F.+ | 76 | 319 | 18 | 22.0 |
| Total | 68 | 288 | 20 | 19.6 |

EXAMPLE 2

The present example serves to demonstrate the improvements in catalyst activity and stability, process operability and product quality afforded by the process of the invention during a prolonged test run in excess of 70 days.

Figure 5:
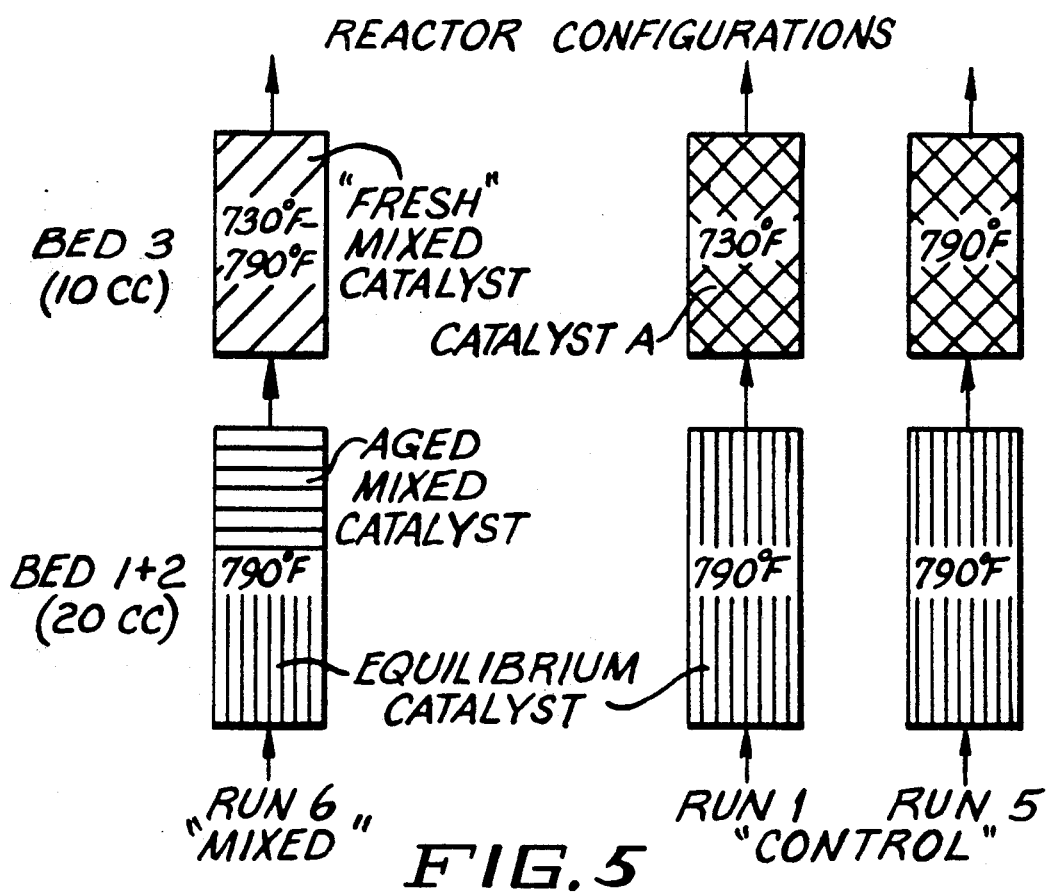
FIG. 5 is a schematic drawing of reactor configurations used to compare the process of the invention with a comparative process for catalysts tested in Example 2.

FIG. 5 shows reactor-loading diagrams for the invention run 6 and comparative process runs 1 and 5. Run 1 is described in Example 1.

Both test runs were carried at the same conditions as in Example 1 except for the reactor loadings. In invention run 6, the reactor's first bed contained 10 cc of commercial equilibrium hydrotreating catalyst as described in Table 1. The second bed contained 10 cc of "aged" mixed catalyst of which 7 cc was catalyst C and 3 cc was catalyst B as described in Table II.

This "aged" catalyst had approximately 1.5 wt. % Ni+V deposited upon it and was obtained from run 1 in Example 1.

Aged catalyst was employed in bed 2 to simulate a three-stage commercial ebullated bed hydrotreating process wherein spent catalyst from the third stage is recycled to the second stage. The third bed contained 10 cc of fresh mixed catalyst with the present invention consisting of 7 cc of catalyst C and 3 cc of catalyst B as set out in Table II.

In comparative runs 1 and 5, reactor beds 1 and 2 were loaded with 20 cc of equilibrium hydrotreating catalyst as described in Table I.

Bed 3 of the control reactor contained 10 cc of catalyst A described in Table II, a bimodal catalyst.

Both the invention and comparative reactors were loaded as described in Example 1.

Runs 1, 5, and 6 were carried out at 2,000 psig. The first reactor, i.e., beds 1 and 2, temperature was 790° F. in all runs. The bed 3 temperatures were 730° F., 790° F. and 730° to 790° F. for runs 1, 5 and 6, respectively. The invention run 6 lasted 73 days; whereas the comparative runs lasted about 25 days. Conversion of the material boiling over 1,00020 F. to material boiling below 1,000° F. varied from 65 to 75 wt. %.

The feeds used in both the comparative and invention runs were varied. Table III sets out the feedstock properties for the feedstocks designated as A and B.

Table VI below sets forth the invention run history.

TABLE VI

PROCESS HISTORY OF INVENTION RUN 6
H₂ Circulation: 9,000 SCFB
Pressure: 2,000 psig

| Days On Oil | Feed | Reactor Bed Temperature, °F. 1 | 2 | 3 | Overall LHSV, hr⁻¹ |
|---|---|---|---|---|---|
| 0 | A | — | — | — | — |
| 1–23 | A | 790 | 790 | 730 | 0.2 |
| 24–30 | A | 790 | 790 | 750 | 0.2 |
| 31–37 | A | 790 | 790 | 790 | 0.2 |
| 38–51 | B | 770 | 770 | 770 | 1.0 |
| 52–67 | A | 790 | 790 | 750 | 0.2 |
| 68–73 | A | 790 | 790 | 790 | 0.2 |

| Days On Oil | % Ni + V on Fresh Catalyst Basis Overall[1] | Delta[2] | 1 | 2 | 3 |
|---|---|---|---|---|---|
| 0 | 2.7 | 0 | 7.5[3] | 1.5[4] | 0 |
| 1–23 | | | | | |
| 24–30 | | | | | |
| 31–37 | 10.7 | 8.0 | 25–30 | 5–7 | 2–3 |
| 38–51 | | | | | |
| 52–67 | 22.5 | 19.8 | | | |
| 68–73 | 26.2 | 23.5 | 60–65 | 15–20 | 6.6[3] |

Figure 6:
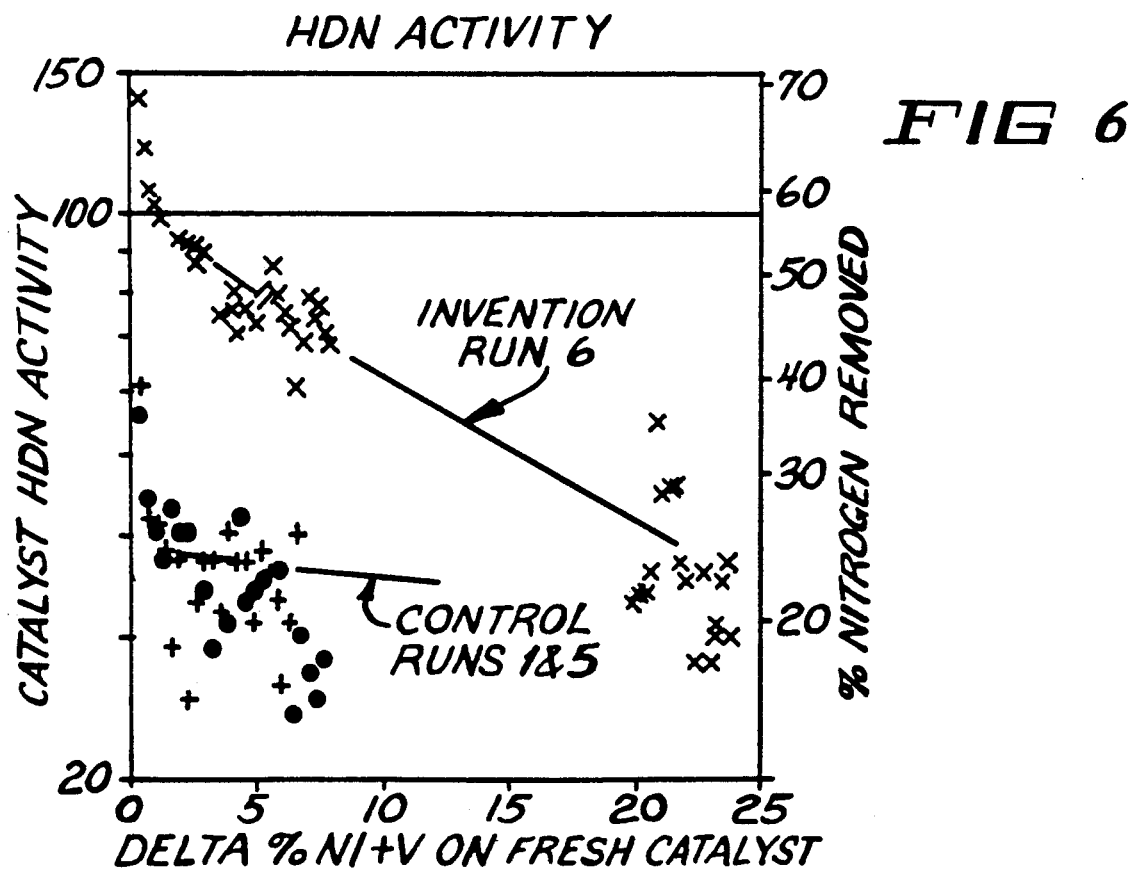
FIG. 6 is a plot of hydrodenitrogenation activity vs. % accumulation nickel plus vanadium on catalysts tested in Example 2.

[1] Calculated by overall metals balance across Beds 1, 2, and 3
[2] Abscissa of FIGS. 6–10.
[3] Measured
[4] Estimated based on Ex. 1 metals balance FIG. 6 depicts a plot of the denitrogenation activity of the invention and comparative runs versus percent accumulation nickel plus vanadium on fresh catalyst for beds 1, 2, and 3. FIG. 6 shows that 45% of the nitrogen in the feedstock is removed after 8 wt % Ni+V accumulation using the process of the invention as compared to only 20 wt. % being removed in the comparative process. By the end of the runs both the mixed and control catalysts have similar denitrogenation activities. The invention run displayed stable performance at the end of the run.

Figure 7:
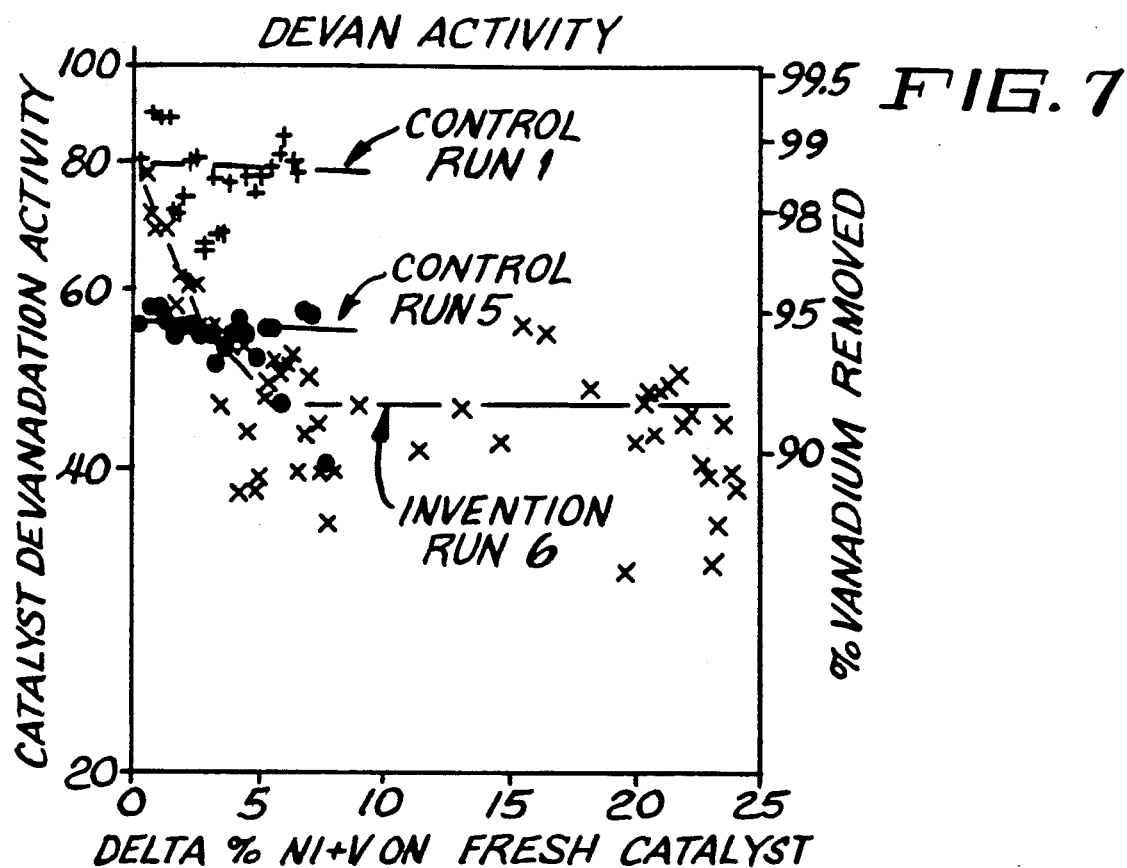
FIG. 7 is a plot of devanadation activity vs. % accumulation nickel plus vanadium on catalysts tested in Example 2.
Figure 8:
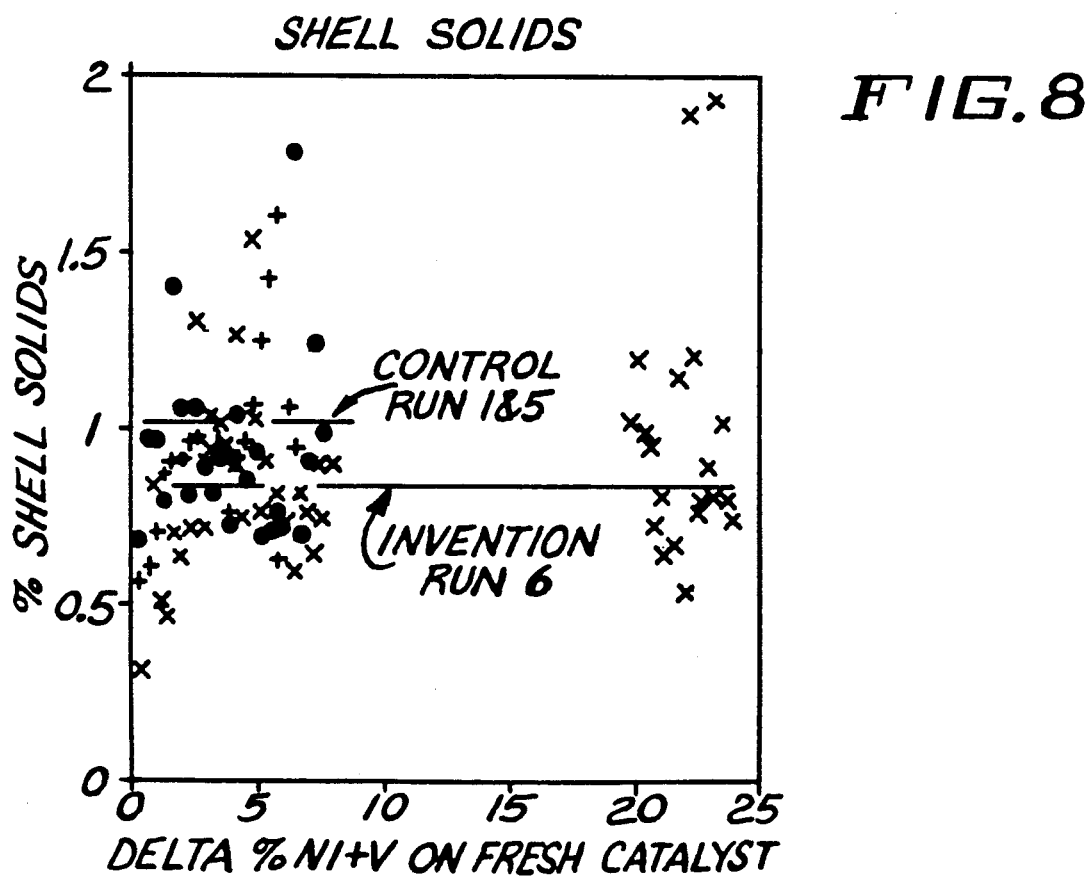
FIG. 8 is a plot of percentage Shell hot filtration solids vs. % accumulation nickel plus vanadium on tested catalysts.

FIG. 7 depicts a plot of devanadation activity versus percent accumulation nickel plus vanadium. FIG. 7 shows that 90% of the vanadium in the feedstock is removed by using the invention process as compared with 98 to 99% for the comparative process run 1 and about 95% for comparative run 5 after the process has "lined out." This is consistent with the predominantly overall small pore character of the invention mixed catalyst system. Despite this, FIG. 8 shows that the operability for the invention run was excellent, with about 20% less Shell hot filtration solids formation than in the comparative runs 1 and 5.

Figure 9:
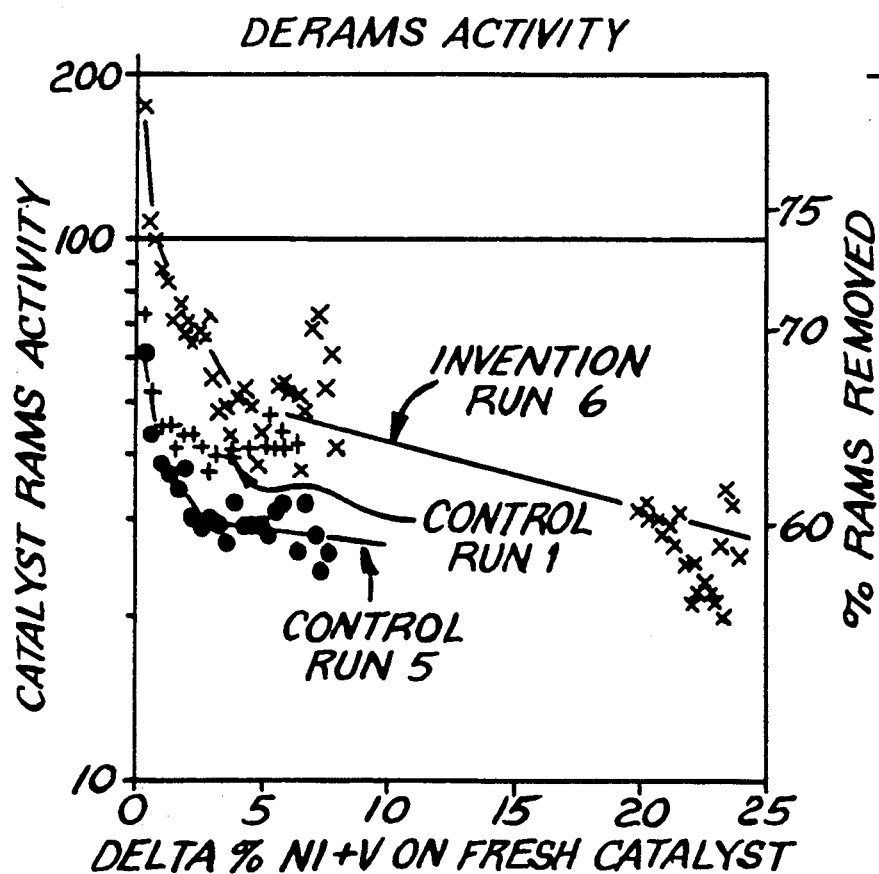
FIG. 9 is a plot of rams carbon activity vs. % accumulation nickel plus vanadium on catalysts tested in Example 2.
Figure 10:
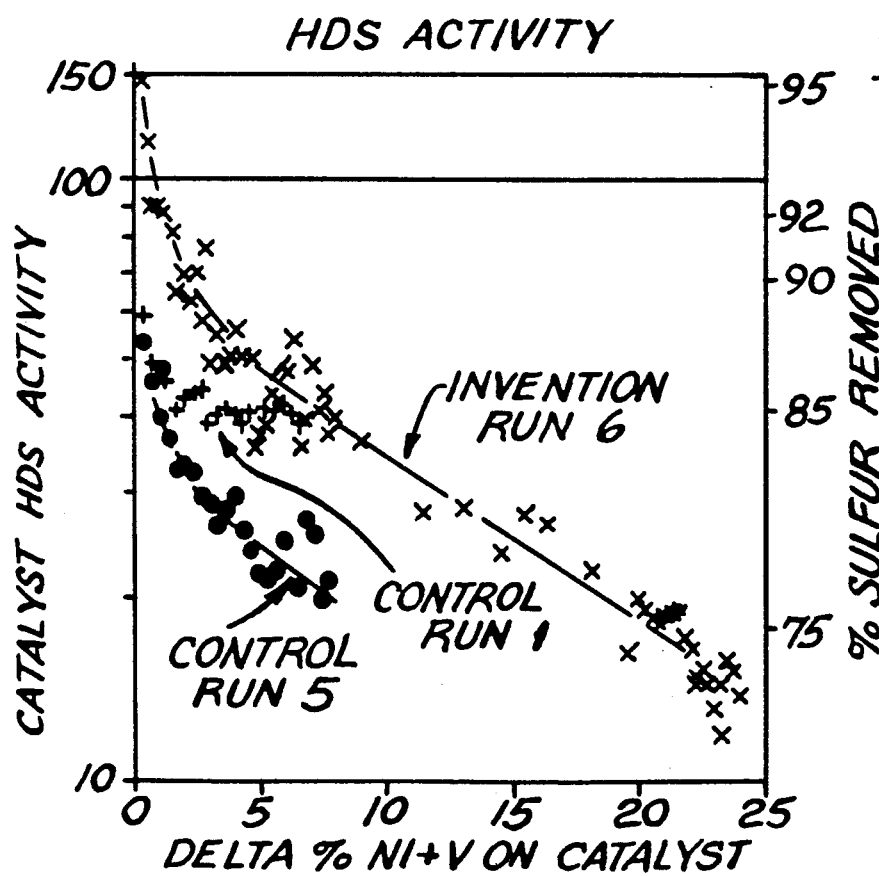
FIG. 10 is a plot of hydrodesulfurization activity vs. % accumulation nickel plus vanadium on catalysts tested in Example 2.

FIGS. 9 and 10 show plots of Ramscarbon removal activity and sulfur removal activity versus percent accumulation nickel plus vanadium, respectively, for the invention and comparative runs. The rate of deactivation for the invention run in both figures appears to be similar to that for the comparative run.

Desulfurization activity assuming pseudo-second order with an activation energy of 83,300 BTU/lb-mol was calculated in accordance with the following equation:

$$A_s = \frac{\left\{\left(\frac{1}{S_p \times .93}\right) - \left(\frac{1}{S_F}\right)\right\} \times LHSV}{k_s \times P \times (e^{-E/RT})}$$

where:

$A_s$ is desulfurization activity
$k_s$ is pre-exponential feed sulfur factor (1420×10⁶ hr⁻¹ psig⁻¹/wt %)
$S_P$ is product sulfur content, wt %
P is total pressure, psig
$S_F$ is feed sulfur content, wt %
T is absolute kinetic average temperature, °R, defined previously
E is activation energy, 83,300 Btu/lb-mol
LHSV is liquid (volumetric) hourly space velocity, hr⁻¹

Ramscarbon removal activity assuming pseudo-second-order kinetics with an activation energy of 83,300 BTU/lb-mol was calculated in accordance with the following equation:

$$A_r = \frac{\left\{\left(\frac{1}{R_p \times .93}\right) - \left(\frac{1}{R_F}\right)\right\} \times LHSV}{k_r \times P \times (e^{-E/RT})}$$

where $A_r$ is ramscarbon removal activity $k_r$ is pre-exponential feed ramscarbon factor ($103 \times 10^6$ hr$^{-1}$ psig$^{-1}$/wt %)

$R_P$ is product ramscarbon content, wt %

$R_F$ is feed ramscarbon content, wt %

P is total pressure, psig

T is absolute kinetic average temperature, °R, defined previously

E is activation energy, 83,300 Btu/lb-mol

LHSV is liquid (volumetric) hourly space velocity, hr$^{-1}$

Tables VII and VIII show dramatically improved product quality after the initial "line-out" period for the invention process contrasted with the comparative process. Table VIII compares product quality between invention run 6 and comparative run 1 when beds 1 and 2 were 790° F. and bed 3 was 730° F. Resid conversion level for material boiling over 1,000° F. to material boiling below 1,000° F. was about 65 wt % for each. Table VIII compares product quality between invention run 6 and comparative run 5 when beds 1, 2 and 3 were at 790° F. Resid conversion level for the invention run 6 was 74% but only 67.3% for the comparative run 5 under these conditions. Distillations in all cases were performed on product obtained between days 17 to 37, or at 4-8% delta Ni+V, as noted in Table VII. Table VII shows that the effluent naphtha had 85% less nitrogen and 50% less sulfur when the catalyst mixture of the invention was used. This enhances the value of the naphtha as a reformer feed. Effluent distillate from the invention process had 75% less nitrogen than the effluent distillate from the comparative process. Invention effluent gas oil had 40% less nitrogen and 20% fewer multi-aromatics, which significantly improved its value as fluidized catalytic cracking process feedstock, as indicated by microactivity tests set out below. Ramscarbon conversion was about 65 wt. % for both systems.

Table VIII shows similar large improvements in product quality for the invention-mixed catalyst system at 74 wt. % 1,000° F.+ conversion of the material boiling above 1,000° F. to material boiling below 1,000° F.

TABLE VII

PRODUCT QUALITY AFTER INITIAL LINE-OUT:
Beds 1, 2 = 790° F., Bed 3 = 730° F.

Invention Run at 24 Days on Oil
(64% 1000° F.+ Conversion)

| | Sim Dist Corrected Yield (Wt % Feed) | API | N (ppm) | S (wt %) |
|---|---|---|---|---|
| H$_2$S | 4.2 | — | | |
| C$_1$-C$_4$ | 2.0 | — | | |
| IBP-360° F. | 7.3 | 57.1 | 53 | 0.019 |
| 360-650° F. | 20.9 | 34.5 | 498 | 0.051 |
| 650-1000° F. | 36.3 | 22.3 | 1960 | 0.295 |
| 1000° F.+ | 31.5 | 8.0 | 5,780 | 1.490 |
| Total | | | | |
| Calc | 102.2 | 23.0 | 2,640 | 0.577 |
| Meas (TLP) | | (22.6) | (2,720) | (0.728) |

TABLE VII-continued

PRODUCT QUALITY AFTER INITIAL LINE-OUT:
Beds 1, 2 = 790° F., Bed 3 = 730° F.

| | Mass Spec (Vol %) | | | NMR |
|---|---|---|---|---|
| | Total Arom | Mono | Di | Tri+ | C$_A$ (Atom %) |
| H$_2$S | — | | | | |
| C$_1$-C$_4$ | — | | | | |
| IBP-360° F. | 12.3 | 12.0 | 0.3 | 0.0 | |
| 360-650° F. | 34.7 | 30.3 | 3.6 | 0.3 | |
| 650-1000° F. | 45.0 | 22.0 | 8.5 | 7.9 | 20.8 |
| 1000° F.+ | — | — | — | — | 33.3 |
| Total | | | | | |
| Calc | | | | | |
| Meas (TLP) | | | | | |

| | Ni (ppm) | V (ppm) | Fe (ppm) | Rams (wt %) |
|---|---|---|---|---|
| H$_2$S | | | | |
| C$_1$-C$_4$ | | | | |
| IBP-360° F. | | | | |
| 360-650° F. | | | | |
| 650-1000° F. | | | | |
| 1000° F.+ | 45 | 52 | 20 | 22.8 |
| Total | | | | |
| Calc | 13 | 15 | 6 | 6.73 |
| Meas (TLP) | (25) | (26) | (2) | (7.47) |

| | Sim Dist (Wt % Off Over T$_1$-T$_2$) | Liq Dist Yield (wt %) |
|---|---|---|
| H$_2$S | — | — |
| C$_1$-C$_4$ | — | — |
| IBP-360° F. | 0-90.5 | 7.1 |
| 360-650° F. | 5.0-96.0 | 20.5 |
| 650-1000° F. | 6.0-92.5 | 42.7 |
| 1000° F.+ | — | 29.5 |
| Total - Calc | | 99.8 |

Comparative Run 1 at 22 Days on Oil
(65% 1000° F.+ Conversion)

| | Sim Dist Corrected Yield (Wt % Feed) | API | N (ppm) | S (wt %) |
|---|---|---|---|---|
| H$_2$S | 4.2 | — | | |
| C$_1$-C$_4$ | 3.0 | — | | |
| IBP-360° F. | 5.1 | 56.6 | 317 | 0.036 |
| 360-650° F. | 20.0 | 33.6 | 1,550 | 0.115 |
| 650-1000° F. | 38.9 | 19.3 | 3,350 | 0.740 |
| 1000° F.+ | 29.8 | 4.6 | 7,450 | 1.67 |
| Total | | | | |
| Calc | 101.0 | 20.0 | 3,940 | 0.831 |
| Meas (TLP) | | (20.7) | (4,000) | (0.86) |

| | Mass Spec (Vol %) | | | | NMR |
|---|---|---|---|---|---|
| | Total Arom | Mono | Di | Tri+ | C$_A$ (Atom %) |
| H$_2$S | — | | | | |
| C$_1$-C$_4$ | — | | | | |
| IBP-360° F. | 13.8 | 13.2 | 0.4 | 0.0 | |
| 360-650° F. | 35.8 | 28.5 | 5.6 | 0.4 | |
| 650-1000° F. | 50.7 | 20.7 | 10.3 | 9.9 | 25.9 |
| 1000° F.+ | — | — | — | — | 39.6 |
| Total | | | | | |
| Calc | | | | | |
| Meas (TLP) | | | | | |

| | Ni (ppm) | V (ppm) | Fe (ppm) | Rams (wt %) |
|---|---|---|---|---|
| H$_2$S | | | | |
| C$_1$-C$_4$ | | | | |
| IBP-360° F. | | | | |
| 360-650° F. | | | | |
| 650-1000° F. | | | | |
| 1000° F.+ | 56 | 11 | <2 | 25.3 |
| Total | | | | |
| Calc | 15 | 3 | <2 | 7.00 |
| Meas (TLP) | (15) | (6) | (<2) | (7.90) |

TABLE VII-continued

PRODUCT QUALITY AFTER INITIAL LINE-OUT:
Beds 1, 2 = 790° F., Bed 3 = 730° F.

|  | Sim Dist (Wt % Off Over $T_1$-$T_2$) | Liq Dist Yield (wt %) |
|---|---|---|
| $H_2S$ | — | — |
| $C_1$-$C_4$ | — | — |
| IBP-360° F. | 0-93.0 | 5.4 |
| 360-650° F. | 20-96.0 | 19.9 |
| 650-1000° F. | 4.5-91.5 | 46.6 |
| 1000° F.+ | — | 27.6 |
| Total - Calc |  | 99.5 |

TABLE VIII

PRODUCT QUALITY AFTER INITIAL LINE-OUT:
Beds 1, 2, 3 at 790° F.

Invention Run 6 after 37 Days on Oil
(74% 1000° F.+ Conversion)

|  | Sim Dist Corrected Yield (Wt % Feed) | N API | S (ppm) | (wt %) |
|---|---|---|---|---|
| $H_2S$ | 4.5 | — |  |  |
| $C_1$-$C_4$ | 2.4 | — |  |  |
| IBP-360° F. | 9.6 | 57.2 | 64 | 0.044 |
| 360-650° F. | 26.3 | 34.5 | 434 | 0.060 |
| 650-1000° F. | 36.3 | 21.6 | 1,970 | 0.33 |
| 1000° F.+ | 22.7 | 5.8 | 6,480 | 1.54 |
| Total |  |  |  |  |
| Calc | 102.6 | 24.8 | 2,350 | 0.492 |
| Meas (TLP) |  | (24.0) | (2,530) | (0.625) |

|  | Mass Spec (Vol %) | | | NMR $C_A$ (Atom %) |
|---|---|---|---|---|
|  | Total Arom | Mono | Di | Tri+ | |
| $H_2S$ | — |  |  |  |  |
| $C_1$-$C_4$ | — |  |  |  |  |
| IBP-360° F. | 12.4 | 12.1 | 0.3 | 0.0 |  |
| 360-650° F. | 33.6 | 28.8 | 4.1 | 0.2 |  |
| 650-1000° F. | 42.7 | 19.1 | 8.7 | 8.7 |  |
| 1000° F.+ | — | — | — | — | 23.2 |
| Total |  |  |  |  |  |
| Calc |  |  |  |  |  |
| Meas (TLP) |  |  |  |  |  |

|  | Ni (ppm) | V (ppm) | Fe (ppm) | Rams (wt %) |
|---|---|---|---|---|
| $H_2S$ |  |  |  |  |
| $C_1$-$C_4$ |  |  |  |  |
| IBP-360° F. |  |  |  |  |
| 360-650° F. |  |  |  |  |
| 650-1000° F. |  |  |  |  |
| 1000° F.+ | 32 | 28 | 3 | 26.2 |
| Total |  |  |  |  |
| Calc | 7 | 6 | <2 | 5.71 |
| Meas (TLP) | (19) | (14) | (2) | (6.00) |

|  | Sim Dist (Wt% Off Over $T_1$-$T_2$) | Liq Dist Yield (wt %) |
|---|---|---|
| $H_2S$ | — | — |
| $C_1$-$C_4$ | — | — |
| IBP-360° F. | 0-95.0 | 9.5 |
| 360-650° F. | 3.5-98.0 | 26.3 |
| 650-1000° F. | 5.0-95.5 | 41.7 |
| 1000° F.+ | — | 21.8 |
| Total - Calc |  | 99.3 |

Comparative Run 5 at 23 Days on Oil
(67.3% 1000° F.+ Conversion)

|  | Sim Dist Corrected Yield (Wt % Feed) | API | N (ppm) | S (wt %) |
|---|---|---|---|---|
| $H_2S$ | 4.1 | — |  |  |

TABLE VIII-continued

PRODUCT QUALITY AFTER INITIAL LINE-OUT:
Beds 1, 2, 3 at 790° F.

| $C_1$-$C_4$ | 3.5 | — |  |  |
|---|---|---|---|---|
| IBP-360° F. | 6.9 | 56.9 | 250 | 0.090 |
| 360-650° F. | 21.5 | 34.9 | 1,270 | 0.171 |
| 650-1000° F. | 36.8 | 19.8 | 3,280 | 0.80 |
| 1000° F.+ | 28.0 | 4.5 | 7,520 | 1.95 |
| Total |  |  |  |  |
| Calc | 100.8 | 20.9 | 3,800 | 0.93 |
| Meas (TLP) |  | (21.3) | (3,950) | (1.02) |

|  | Mass Spec (Vol %) | | | NMR $C_A$ (Atom %) |
|---|---|---|---|---|
|  | Total Arom | Mono | Di | Tri+ |  |
| $H_2S$ | — |  |  |  |  |
| $C_1$-$C_4$ | — |  |  |  |  |
| IBP-360° F. | 12.8 | 12.5 | 0.3 | 0.0 |  |
| 360-650° F. | 35.5 | 28.6 | 5.7 | 0.3 |  |
| 650-1000° F. | 49.0 | 19.5 | 10.2 | 10.4 |  |
| 1000° F.+ | — | — | — | — | 38.9 |
| Total |  |  |  |  |  |
| Calc |  |  |  |  |  |
| Meas (TLP) |  |  |  |  |  |

|  | Ni (ppm) | V (ppm) | Fe (ppm) | Rams (wt %) |
|---|---|---|---|---|
| $H_2S$ |  |  |  |  |
| $C_1$-$C_4$ |  |  |  |  |
| IBP-360° F. |  |  |  |  |
| 360-650° F. |  |  |  |  |
| 650-1000° F. |  |  |  |  |
| 1000° F.+ | 39 | 25 | 6 | 36.7 |
| Total |  |  |  |  |
| Calc | 11 | 7 | 1 | 10.3 |
| Meas (TLP) | (16) | (11) | (1) | (8.1) |

|  | Sim Dist (Wt % Off Over $T_1$-$T_2$) | Liq Dist Yield (wt %) |
|---|---|---|
| $H_2S$ | — | — |
| $C_1$-$C_4$ | — | — |
| IBP-360° F. | 0-90.5 | 7.2 |
| 360-650° F. | 4.0-98.0 | 21.7 |
| 650-1000° F. | 4.5-95.5 | 42.7 |
| 1000° F.+ | — | 28.0 |
| Total - Calc |  | 99.6 |

As seen in both Tables VII and VIII, the lower demetallation activity of the predominantly small-pore, invention-mixed system nearly doubles the metals content of the vacuum resid product. However, in refinery systems when anode grade coke is not a major product of the heavy hydrocarbon hydrotreating system, resid metals content is not critical to economic comparisons between the two catalysts.

Table IX below shows the product quality of the invention-mixed catalyst run at the end of the run at 73 days on oil, or at 25% accumulation of Ni+V. The temperature in all 3 beds was 790° F. Comparative data from run 5 are shown for the control catalyst run after only 23 days on oil in Table VIII above. Conversion of 1,000° F.+ material was about 65 wt. % in both cases.

A direct comparison is not appropriate for two reasons: (1) metals-on-catalyst at the end of the invention-mixed catalyst run are also 2-3 times higher than the control; (2) metals-on-catalyst at the end of the invention-mixed catalyst run far exceed levels in commercial equilibrium catalysts in all three beds, particularly in the first bed as explained above.

Notwithstanding the above observations, "end-of-run" product quality and unit operability were surprisingly good for the process of the invention-mixed system. The invention-mixed catalyst system still had significant activity for denitrogenation in the 1,000° F.−boiling range product fractions. Gas oil nitrogen was 15–20% and distillate nitrogen was 40% lower for the invention-mixed catalyst system than the results achieved with the comparative system. Multiaromatics content in gas oil from the invention-mixed catalyst system was also 10–15% lower than in the comparative process. Although sulfur content is higher for the invention, it is not considered as crucial as nitrogen removal or aromatic saturation in many refinery applications.

Metals content in the 1,000° F.+ product for the invention run was about twice that in the comparative as in the early part of the invention run, but, more importantly, the Ramscarbon contents were lower in the invention run.

TABLE IX

PRODUCT QUALITY AT END-OF-RUN:
Beds 1, 2, 3 = 790° F.

Invention Run 6 at 73 Days on Oil
(64% 1000° F.+ Conversion)

|  | Sim Dist Corrected Yield (Wt % Feed) | N API | S (ppm) | (wt %) |
|---|---|---|---|---|
| $H_2S$ | 3.7 | — |  |  |
| $C_1$-$C_4$ | 2.3 | — |  |  |
| IBP-360° F. | 8.5 | — | 296 | 0.173 |
| 360–650° F. | 22.8 | 34.4 | 752 | 0.49 |
| 650–1000° F. | 33.0 | 20.6 | 2,720 | 1.17 |
| 1000° F.+ | 30.8 | 4.9 | 7,420 | 2.38 |
| Total |  |  |  |  |
| Calc | 101.1 | — | 3,795 | 1.30 |
| Meas (TLP) |  | (21.9) | (3,700) | (1.44) |

|  | Mass Spec (Vol %) |  |  |  | NMR $C_A$ (Atom %) |
|---|---|---|---|---|---|
|  | Total Arom | Mono | Di | Tri+ |  |
| $H_2S$ |  |  |  |  |  |
| $C_1$-$C_4$ |  |  |  |  |  |
| IBP-360° F. | 11.0 | 10.6 | 0.3 | 0.0 |  |
| 360–650° F. | 30.8 | 24.4 | 4.8 | 0.4 |  |
| 650–1000° F. | 43.0 | 17.4 | 9.2 | 8.8 | 23.8 |
| 1000° F.+ | — | — | — | — | 39.7 |
| Total |  |  |  |  |  |
| Calc |  |  |  |  |  |
| Meas (TLP) |  |  |  |  |  |

|  | Ni (ppm) | V (ppm) | Fe (ppm) | Rams (wt %) |
|---|---|---|---|---|
| $H_2S$ |  |  |  |  |
| $C_1$-$C_4$ |  |  |  |  |
| IBP-360° F. |  |  |  |  |
| 360–650° F. |  |  |  |  |
| 650–1000° F. |  |  |  |  |
| 1000° F.+ | 38 | 43 | <2 | 25.7 |
| Total |  |  |  |  |

TABLE IX-continued

PRODUCT QUALITY AT END-OF-RUN:
Beds 1, 2, 3 = 790° F.

| Calc | 12 | 14 | <2 | 7.92 |
|---|---|---|---|---|
| Meas (TLP) | (22) | (22) | (<2) | (8.14) |

|  | Sim Dist (Wt % Off Over $T_1$-$T_2$) | Liq Dist Yield (wt %) |
|---|---|---|
| $H_2S$ | — | — |
| $C_1$-$C_4$ | — | — |
| IBP-360° F. | 0–92.5 | 8.8 |
| 360–650° F. | 3.5–97.5 | 22.4 |
| 650–1000° F. | — | 36.5 |
| 1000° F.+ | — | 31.5 |
| Total - Calc |  | 99.2 |

Table X shows that hydrogen consumption was much more efficient throughout the 73-day duration of the invention-mixed catalyst run compared with the comparative run. Regardless of 1,000° F.+ conversion, about 75% of the hydrogen used went into liquid product for the invention-mixed catalyst system compared with only 60% for the comparative system. Conversely, only 13–16% of the hydrogen went into $C_1$-$C_4$ gas for the invention-mixed catalyst system compared with about 22–24% for the comparative system.

TABLE X

EFFICIENCY OF HYDROGEN CONSUMPTION: INVENTION VS. COMPARATIVE

|  | Days on Oil | 1000° F.+ Conv (wt %) | Rams-carbon Conv[1] (wt %) | Hydrogen Consumption Total (SCFB) | $C_1$-$C_4$ (% of Total) | $C_5$ + Liq (% of Total) |
|---|---|---|---|---|---|---|
| Comparative |  |  |  |  |  |  |
| Run 1 | 17–22 | 65 | 62.1 | 935 | 21.6 | 61.3 |
| Run 5 | 18–25 | 67.3 | 56.0 | 980 | 24.9 | 59.2 |
| Invention |  |  |  |  |  |  |
| Run 6 | 17–24 | 64 | 66.0 | 1020 | 13.2 | 74.8 |
| Run 6 | 32–37 | 74 | 72.0 | 1220 | 13.5 | 73.3 |
| Run 6 | 68–73 | 64 | 60.0 | 970 | 16.6 | 72.4 |

[1]Average Rams conversion based on measured Rams in TLP vs. Rams in Distilled 1,000° F.+ product Table XI compares the reactivity of the hydrotreated gas oils from the invention and comparative processes as measured by microyields test similar to ASTM procedure D3907-86, which test results are representative of gas oil crackability in a fluidized catalytic cracking FCC unit. Gas oils obtained from the invention process run 6 were tested in a microyields test unit: (MYU) one obtained after the initial "line-out" period (day 24) and one obtained at the "end-of-run" (day 73). For comparison, a gas oil obtained from the comparative process run 1 after 22 days and a reference virgin vacuum gas oil were also tested. After 24 days, the invention gas oil product had 20% higher 430° F.+conversion, 25% higher gasoline yield, and 20% lower coke-make than the comparative gas oil. In fact, the reactivity of the invention gas oil was similar to that of the reference virgin vacuum gas oil. After 73 days, the invention gas oil showed a more refractory character but was more reactive then the comparative gas oil.

"Olefinicities" of the $C_3$ and $C_4$ MYU off-gas, expressed as $C_3=/C_3$ and $C_4=/C_4$ ratios, respectively, in Table XI are similar for both the virgin and hydrotreated gas oils. This indicates that there is no detrimental effect on the selectivity of light olefin formation during fluidized catalytic cracking as a result of prior hydrotreatment in using either the comparative or invention catalyst systems.

The "Coke Factor" listed in Table XI expresses the relative coke-forming tendency of gas oils "normalized" for 430° F.+ conversion level. Coke factor is calculated in accordance with the following equation:

$$C.F. = \frac{\text{coke yield on catalyst, wt. \%}}{x/(1-x)}$$

where x is 430° F. + conversion, wt. %.

Higher "coke factors" reflect higher coke formation. Gas oil from the comparative run had the highest coke factor (5.73%) while the virgin vacuum gas oil had the lowest (2.23%). The invention gas oil at 24 days, had nearly the same "coke factor" as the virgin gas oil (3.14%) but still less coke-forming tendency than the comparative even after 73 days on oil (4.87%). Table XI also shows that the octanes (RON and MON) of the MYU gasoline fractions, determined by a gas chromatographic analysis, were similar for all gas oils.

The results of Table XI clearly show that the reactivity at typical cracking conditions of hydrotreated gas oil derived from the invention process when averaged over its useful life is significantly improved compared with gas oil derived from the comparative process. Conversion and gasoline yield increased without sacrificing octane.

are excluded from the interior of the small-pore catalyst. Smaller feed molecules, i.e., those boiling below 1,000° F., may then preferentially enter small pore catalyst C, where the surface area in meso and micropores is higher than in the large pore catalyst B. This interpretation is consistent with the high activity observed using the invention mixed-catalyst system.

TABLE XII

INSPECTIONS OF INVENTION MIXED CATALYST IN BED 3 AFTER 70 DAYS ON OIL[1]

| | Catalyst C | Catalyst B | Composite Bed |
|---|---|---|---|
| Chemical Analyses (wt % Fresh Basis, Al-Tie) | | | |
| C | 15.30 | 35.10 | 18.27 |
| H | 1.07 | 1.88 | 1.19 |
| C + H | 16.37 | 37.00 | 19.46 |
| H/C (molar) | 0.84 | 0.64 | — |
| N | 4.27 | 0.78 | 3.75 |
| S | 12.55 | 22.53 | 14.05 |
| V | 3.3 | 19.6 | 5.8 |
| Ni (accumulated) | 0.3 | 3.5 | 0.8 |
| Ni + V | 3.6 | 23.1 | 6.6 |
| Fe | 0.2 | 0.4 | 0.2 |
| Si | 0.2 | 0.6 | 0.3 |
| Na | 0.2 | 0.2 | 0.2 |
| Mo | 15.1 | 8.4 | — |
| Al | 39.2 | 41.3 | — |
| Al (spent basis) | 29.3 | 21.1 | — |

[1] Spent mixture was Soxhlet extracted in toluene and dried in flowing nitrogen at 200° F. Trilobes catalyst C were then separated from cylinders catalyst B and submitted separately for analysis.
[2] Fresh composite bed 3 = 15 wt % (30 vol %) catalyst B + 85 wt % (70 vol %) catalyst C.

TABLE XI

GAS OIL REACTIVITY: MYU TESTING
MYU Conditions: 972° F. (Avg.), Cat/oil = 3 w/w
24 WHSV

| Origin of Gas Oil | Days on Resid | MYU 430° F.+ Conversion, (wt %) | Yields (wt % Feed) | | Light Gas Olefinicity | | Coke Factor (wt %) | Octanes by GC Method | |
|---|---|---|---|---|---|---|---|---|---|
| | | | $C_5$-430° F. | Coke | $C_3=/C_3$ | $C_4=/C_4$ | | Ron | Mon |
| Control - Run 1 | 22 | 56.7 | 36.89 | 7.50 | 0.79 | 0.63 | 5.73 | 89.8 | 79.3 |
| Mixed - Run 6 | 24 | 66.5 | 46.18 | 6.24 | 0.81 | 0.61 | 3.14 | 89.0 | 79.3 |
| Mixed - Run 6 | 73 | 58.0 | 38.77 | 6.73 | 0.80 | 0.64 | 4.87 | 89.5 | 79.0 |
| Reference Virgin Vacuum Gas Oil | | 64.5 | 45.21 | 4.06 | 0.83 | 0.63 | 2.23 | 89.8 | 79.6 |

Figure 11:
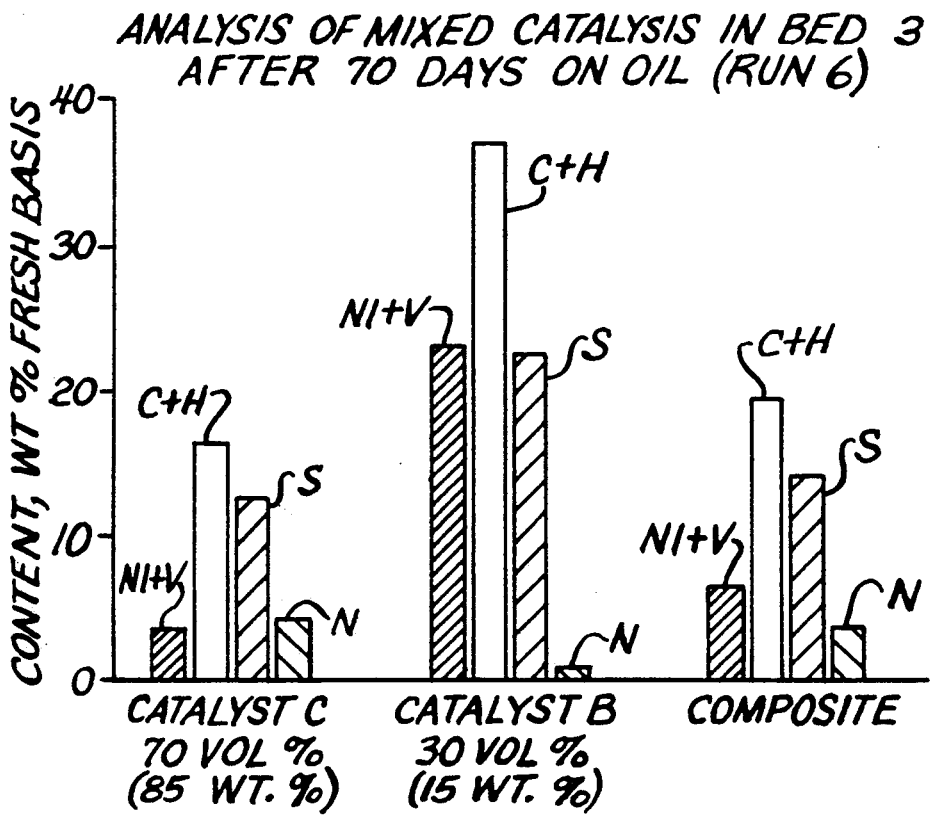
Figure 12:
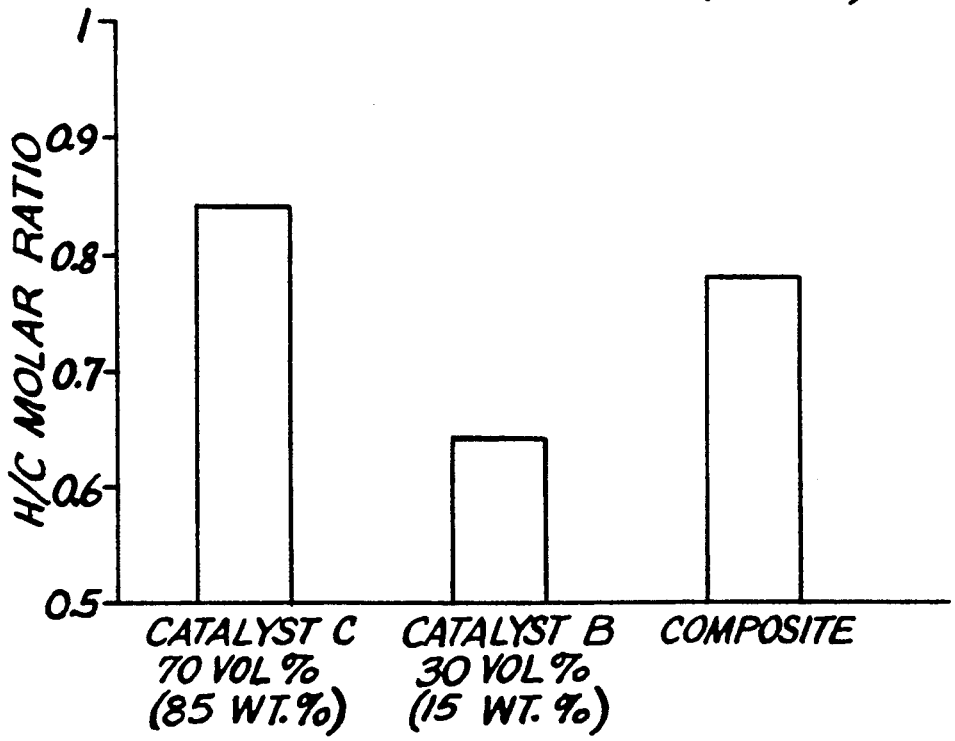

Inspections of the spent mixed catalyst from Bed 3 after 73 days on oil in run 6 are set out in Table XII. FIGS. 11, 12, and 13 summarize these results in bar chart form. FIG. 11 shows that spent large pore catalyst B had nearly seven times more Ni+V, over two times more coke (C+H), and nearly two times more sulfur deposited on its surface compared with spent small pore catalyst C. On the other hand, spent small pore catalyst C had over five times more nitrogen deposited on its surface compared with the spent large pore catalyst B. FIG. 12 shows that the nature of the coke on the spent large pore catalyst B was much "harder" and more aromatic (0.64 H/C molar ratio) compared to the relatively "softer" coke on spent catalyst C (0.84 H/C molar ratio).

FIG. 13 also depicts these results. Notwithstanding the fact that the large pore catalyst comprised only 15 wt. % (30 vol %) of the total catalyst in Bed 3, it accumulated 53% of the Ni+V, 29% of the coke (C+H), 24% of the sulfur, yet only 3% of the nitrogen. If simple dilution were involved, one would have expected 15% accumulation of all these deposits on spent large pore catalyst C.

FIG. 14 shows the vanadium profiles of the two catalysts in the mixed system of bed 3 after 70 days on oil, obtained by electron microprobe. The subject figure shows that large vanadium-containing molecules are absorbed uniformly through the bimodal catalyst B but are excluded from the interior of the small-pore catalyst C.

EXAMPLE 3

The present example serves to demonstrate the efficacy of the present invention for different small pore catalyst to large pore catalyst ratios.

The reactor used in the present example is described in Example 1. The reactor was loaded such that beds 1 and 2 contained the equilibrium commercial hydrotreating catalyst described in Table I. The contents of bed 3 were varied in each run as set out below.

Beds 1 and 2 were maintained at 790° F., while bed 3 was maintained at 730° F. as shown in FIG. 1. The virgin vacuum feedstock described in Table III was passed to the reactor at 0.2 LHSV. The pressure in the reactor was 2,000 psig with a hydrogen addition rate of 0.5 SCFH. Conversion of material boiling above 1,000° F. to material boiling below 1,000° F. was about 65 to 70 wt. %.

Several runs were carried out wherein the third reactor was loaded with a catalyst mixture in accordance with the present invention. Specifically, the small pore catalyst was Catalyst C described in Table II. The large pore catalyst was catalyst B.

The percentage of small pore catalyst in various catalyst mixtures in bed 3 were loaded as follows:

|       | % Large Pore | % Small Pore |
|-------|--------------|--------------|
| Run 3 | 0            | 100          |
| Run 4 | 30           | 70           |
| Run 7 | 50           | 50           |
| Run 8 | 100          | 0            |

FIG. 15 shows the hydrodenitrogenation activity versus % accumulation nickel plus vanadium on fresh catalyst. The figure shows that the "lined-out" or steady-state hydrodenitrogenation activity was the highest when a mixture in accordance with the present invention was employed, i.e., 70% and 50% small pore catalyst. While the run using 100% small pore catalyst had the highest initial activity, it quickly deactivated.

Figure 16:
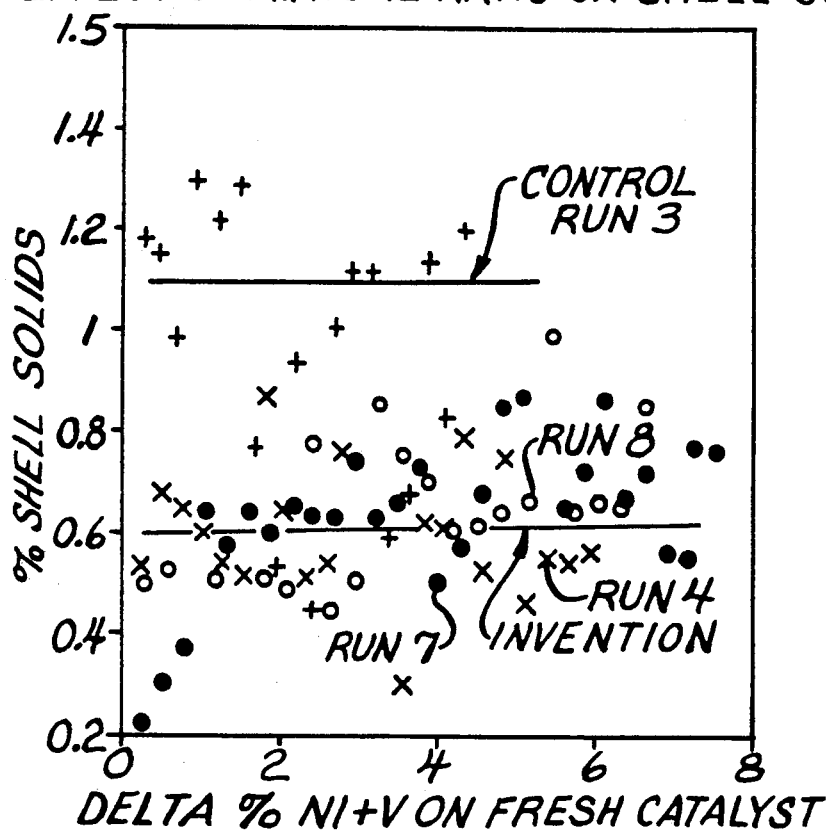
FIG. 16 is a plot of the effect of mixture ratio in the mixed catalyst system on percent Shell hot filtration solids vs. % accumulation nickel plus vanadium on catalysts tested as described in Example 3.

FIG. 16 shows the operability for each run as measured by the amount of Shell hot filtration solids. The figure shows that the comparative run containing all small pore catalyst not unexpectedly exhibited the poorest operability characteristics. The invention runs exhibited operability characteristics equivalent to the comparative run wherein 100% of the large pore catalyst was employed.

EXAMPLE 4

The present example demonstrates the effect of metals content and type upon the process of the invention when the amount and type of metals were varied on the second large pore catalyst. Table XIII below shows the amounts and types of catalyst employed in the runs. Run 1 is a comparative run employing only the large pore catalyst.

TABLE XIII

| Run | Vol. % | Small Pore Catalyst | Vol. % | Large Pore Catalyst |
|-----|--------|---------------------|--------|---------------------|
| 4   | 70     | Catalyst C          | 30     | Catalyst B          |
| 9   | 70     | Catalyst C          | 30     | Catalyst D          |
| 10  | 70     | Catalyst C          | 30     | Catalyst A          |
| 1   | 0      | Catalyst C          | 100    | Catalyst A          |

The above catalysts were loaded in bed 3 of the reactor as described in Example 3 for each run. Beds 1 and 2 were loaded in the same fashion as described in Example 3. Each run was carried out with same feed and under the same conditions as described in Example 3.

Figure 17:
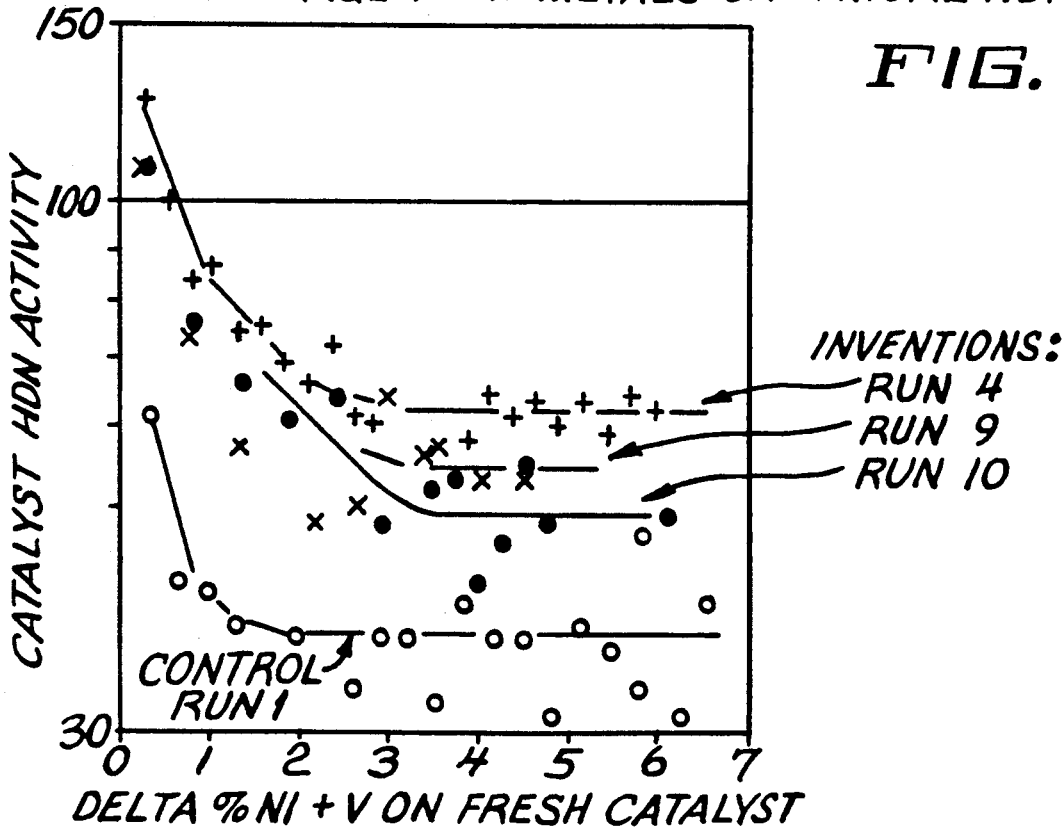
FIG. 17 is a plot of the effect of pore size in the large pore catalysts in the catalyst mixture as it affects hydrodenitrogenation activity vs. % accumulation nickel plus vanadium on tested catalysts. The test runs are described in Example 4.

FIG. 17 shows a plot of hydrodenitrogenation activity versus percent accumulation nickel plus vanadium for all of the above runs. The figure shows that the "lined-out" activity was highest when the levels of nickel and/or molybdenum on the large pore catalyst were the highest as in runs 4 and 9. The mixture containing catalyst A having 0.6% CoO and 4% $MoO_3$ (run 10) displayed a lower activity. Comparative run 1 had the lowest hydrodenitrogenation activity. All of the runs displayed good operability as evidenced by Shell hot filtration solids of 1.0 wt % or less.

EXAMPLE 5

The present example demonstrates the performance of various small pore catalysts used alone and not in accordance with the process of the invention.

Table XIV below describes the properties of several small pore unimodal catalysts having average pore diameters ranging from about 90 to about 123 Angstroms.

These catalysts all have negligible pore volume and surface area in pores having diameters greater than 200 Angstroms in diameter.

Each small pore catalyst described in Table XIV was tested in the third bed of reactors otherwise loaded as described in Example 3. The runs were carried out at the same conditions and with the same feedstock as described in Example 3.

TABLE XIV

SMALL PORE CATALYST

| Run | Catalyst | A, BET $m^2/g$ | V, Pore Vol, ($N^2$ Desorp) cc/g | Avg Mesopore Diam 4V/A, Å | Nominal Metals | Pores w/Diam >200 Å HgPV,cc/g | Pores w/Diam >200 Å HgSA,$m^2/g$ | Pore w/Diam >800 Å HgPV,cc/g | Pore w/Diam >800 Å HgSA,$m^2/g$ |
|-----|----------|----------------|----------------------------------|---------------------------|----------------|-------------------------------|----------------------------------|------------------------------|---------------------------------|
| 11  | E        | 176            | 0.539                            | 123                       | 2% NiO, 10% $MoO_3$ | 0.018                    | 0.6                              | 0.011                        | 0.06                            |
| 12  | F        | 135            | 0.410                            | 121                       | NiO, $MoO_3$   | 0.029                         | 3.8                              | 0.012                        | 0.10                            |
| 13  | G        | 155            | 0.399                            | 103                       | NiO, MoO       | 0.006                         | 0.3                              | 0.004                        | 0.02                            |
| 3   | C        | 199            | 0.448                            | 90                        | See Table II   | 0.012                         | 0.3                              | 0.010                        | 0.03                            |

Figure 18:
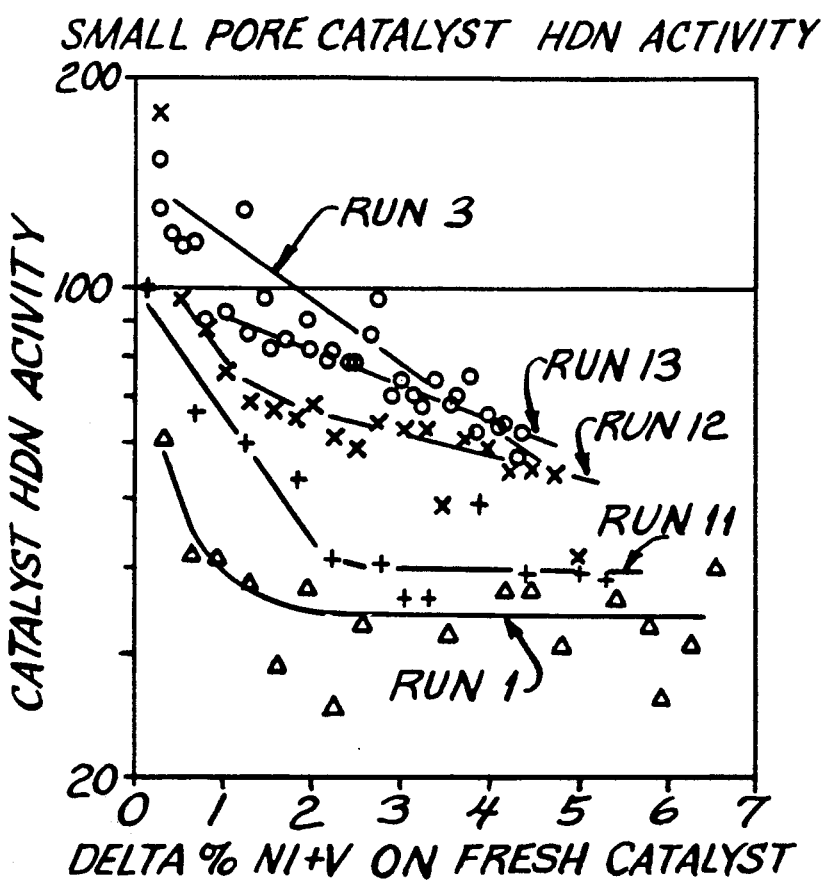
FIG. 18 is a plot of hydrodenitrogenation activity of various small pore catalysts vs. % accumulation nickel plus vanadium on tested catalysts. The test runs are described in Example 5.

FIG. 18 depicts the hydrodenitrogenation activity for each of the runs versus percent accumulation nickel plus vanadium on the catalyst. Another run, run 1 from Example 1, was the control.

Figure 19:
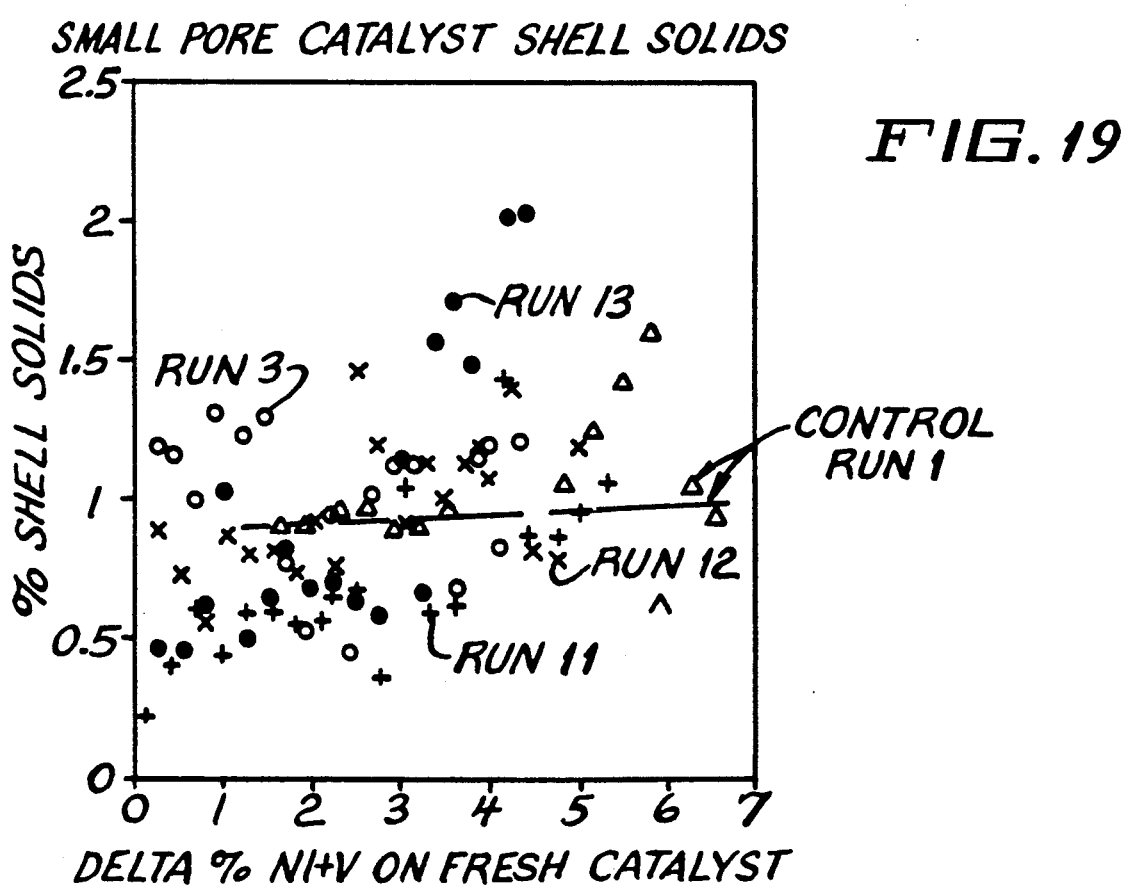
FIG. 19 is a plot of the percent Shell hot filtration solids for several small pore catalysts vs. % accumulation nickel plus vanadium on tested catalysts as described in Example 5.

FIG. 19 clearly shows that when 100% small pore catalyst is employed the operability and stability is inferior to when a large pore catalyst is employed in the hydrotreating process as in run 1. However, all of the small pore catalysts had a greater initial hydrodenitrogenation activity than the large pore catalyst as shown in FIG. 18.

When the small pore catalysts are mixed with the large pore catalyst in accordance with the present invention, the initial high activity of the small pore catalyst can be maintained by improved operability afforded by the presence of the large pore catalyst.

FIG. 18 also shows that about 130 Angstroms is the largest average mesopore diameter suitable for use in the first catalyst in the mixed system in accordance with the present invention. This is the largest average mesopore diameter for the small catalyst that still displays a higher hydrodenitrogenation activity than the large pore catalyst in run 1.

EXAMPLE 6

The present example serves to demonstrate the effect of the amount of macropore volume in the large pore catalyst in the process of the invention.

Specifically, three runs were carried out, two runs 4, and 14, in accordance with the invention, and one comparative run 1 from Example 1. The invention run 14 used a mixed system having 30 vol % catalyst H as set out in Table XV below and 70 vol % small pore catalyst C as set out in Table II.

TABLE XV

| | | LARGE PORE CATALYSTS | | | |
|---|---|---|---|---|---|
| Catalyst | Nominal Metals | BET Surf. Area, $m^2/g$ | Mesopore Volume, cc/g (By $N_2$ Desorp.) | Avg. Mesopore Diam., 4V/A, Å | Macropore Volume in Pores >800 Å Diam., cc/g (By Hg) |
| H | 2.3% Ni 9.0% $MoO_3$ | 188 | 0.578 | 123 | 0.08 |
| I | 3.0% Ni 8.6% Mo 2.1% P | 160 | 0.71 | 177 | 0.02 |

It should be noted that the macropore volume in catalyst H is less than that of catalyst B; 0.08 versus 0.32 cc/g in pores having a diameter greater than 800 Å.

The comparative run 1 from Example 1 used 100% catalyst A, the large pore catalyst described in Table II.

Figure 20:
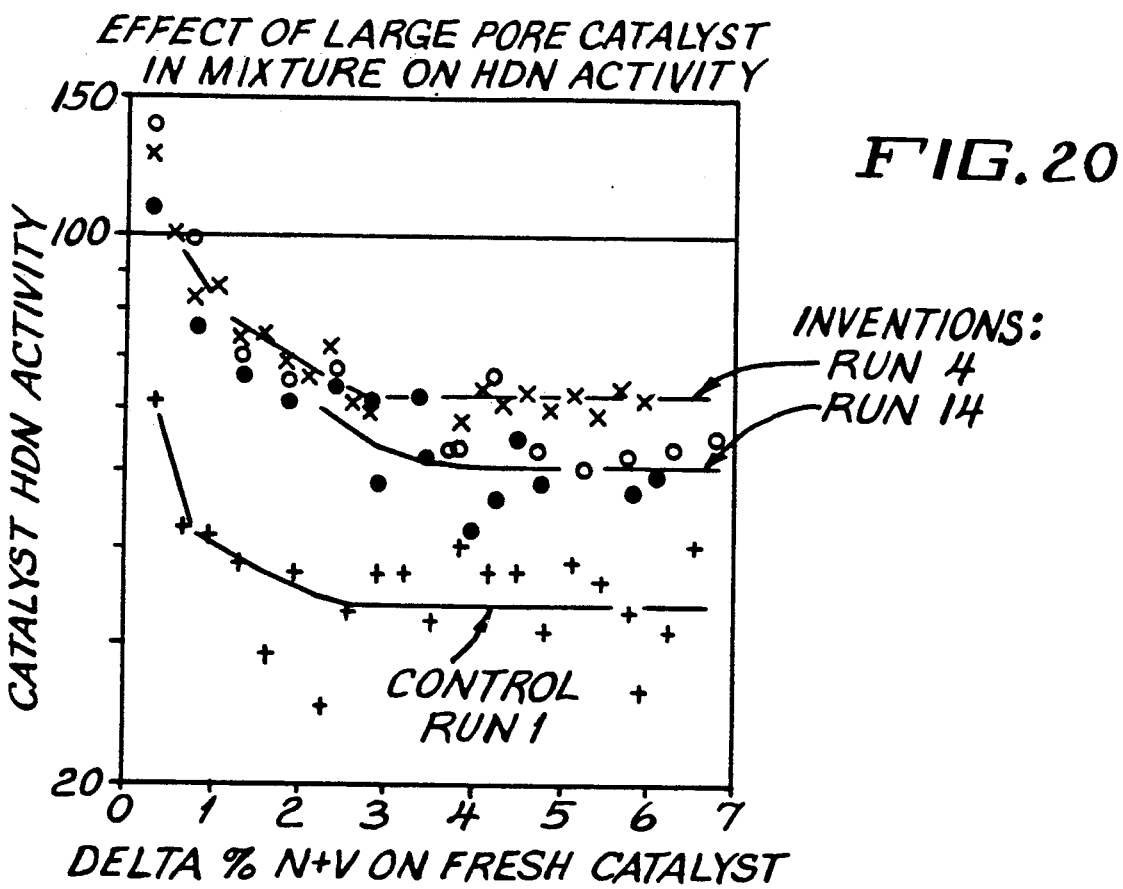
FIG. 20 is a plot of the hydrodenitrogenation activity of a comparative test run and invention test runs wherein various large pore catalysts were utilized within the catalyst mixture vs. % accumulation nickel plus vanadium on tested catalysts as described in Example 6.

FIG. 20 shows a plot of hydrodenitrogenation activity versus percent accumulation nickel plus vanadium, for the above-described runs. The figure shows that the invention catalyst mixture having more macropore volume in the large pore catalyst (run 4) possesses greater hydrodenitrogenation activity than run 14 where the large pore catalyst had less macropore volume. Both invention runs displayed superior hydrodenitrogenation activity than the comparative catalyst run.

Figure 21:
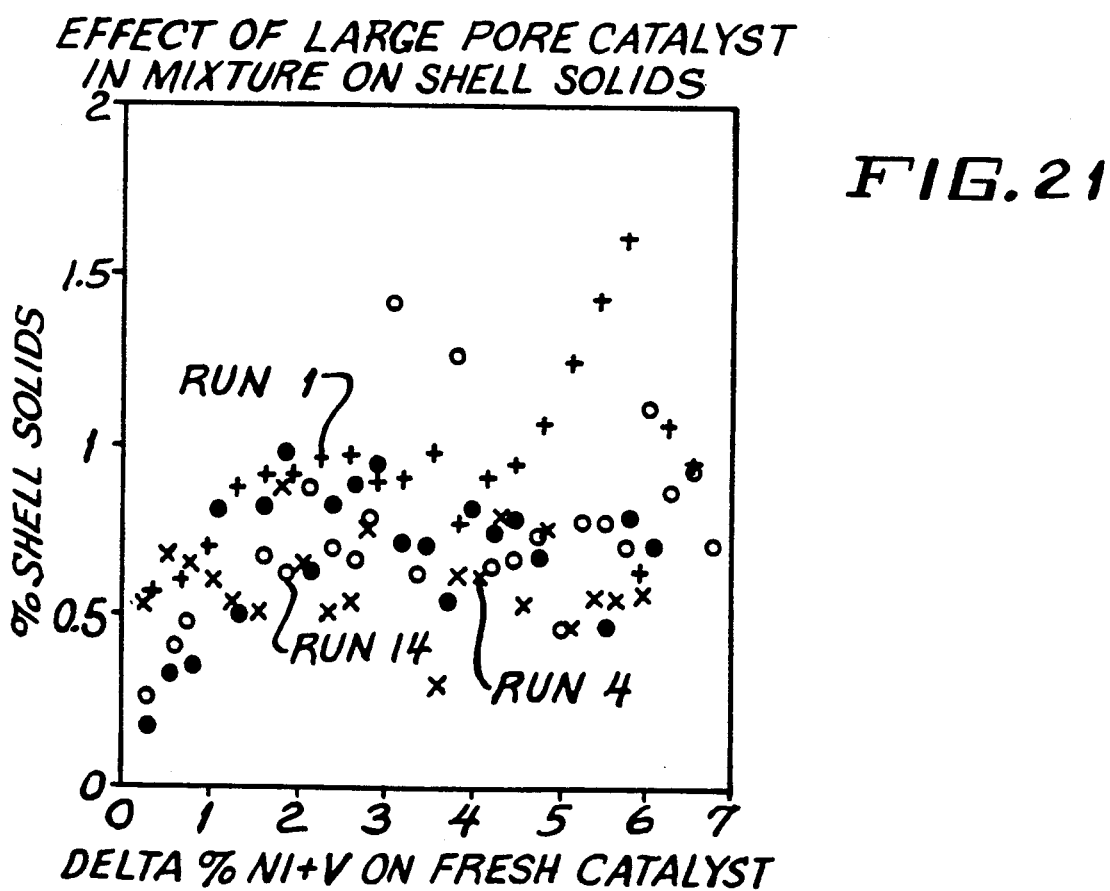
FIG. 21 is a plot of the percentage Shell hot filtration solids for test runs depicted in FIG. 20 wherein various large pore catalysts were utilized in the catalyst mixture vs. % accumulation nickel plus vanadium on tested catalysts as described in Example 6.

FIG. 21 shows that all three runs essentially displayed acceptable operability, i.e., Shell hot filtration solids levels below about 1.0 wt %.

EXAMPLE 7

The present example compares the process of the invention with a "stacked" or layered process wherein the large pore catalyst is upstream of the small pore catalyst.

TABLE XVI

| | | Table for Ex. 7 3rd Bed Catalyst | | | |
|---|---|---|---|---|---|
| | | Large Pore | | Small Pore | |
| VII | Run | Vol % | Catalyst | Vol % | Catalyst |
| Control | 3 | | | 100 | C |
| Invention | 4 (mixed) | 30 | B | 70 | C |
| Control | 8 | 100 | B | | |
| Control | 15 (stacked) | 30 | B | 70 | C |

The invention run is run 4 of Example 1. The stacked run was carried out at the same conditions with the same feed except that that all of the large pore catalyst, i.e., 30 vol % of the total amount of catalyst was situated upstream of the small pore catalyst.

Figure 22:
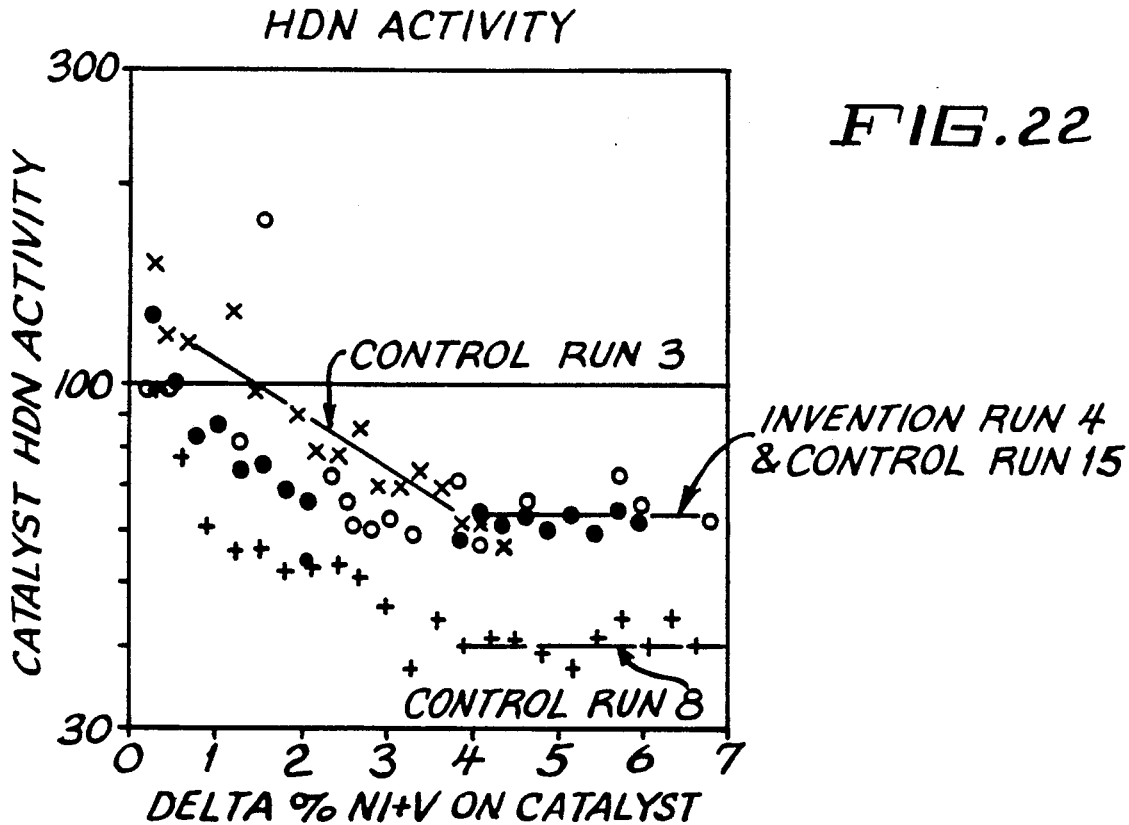
FIG. 22 is a plot of hydrodenitrogenation activity vs. % accumulation nickel plus vanadium on tested catalysts for a stacked process and the process of the invention as described in Example 7.

FIG. 22 shows a plot of hydrodenitrogenation activity versus percent accumulation nickel plus vanadium on the catalyst.

Figure 23:
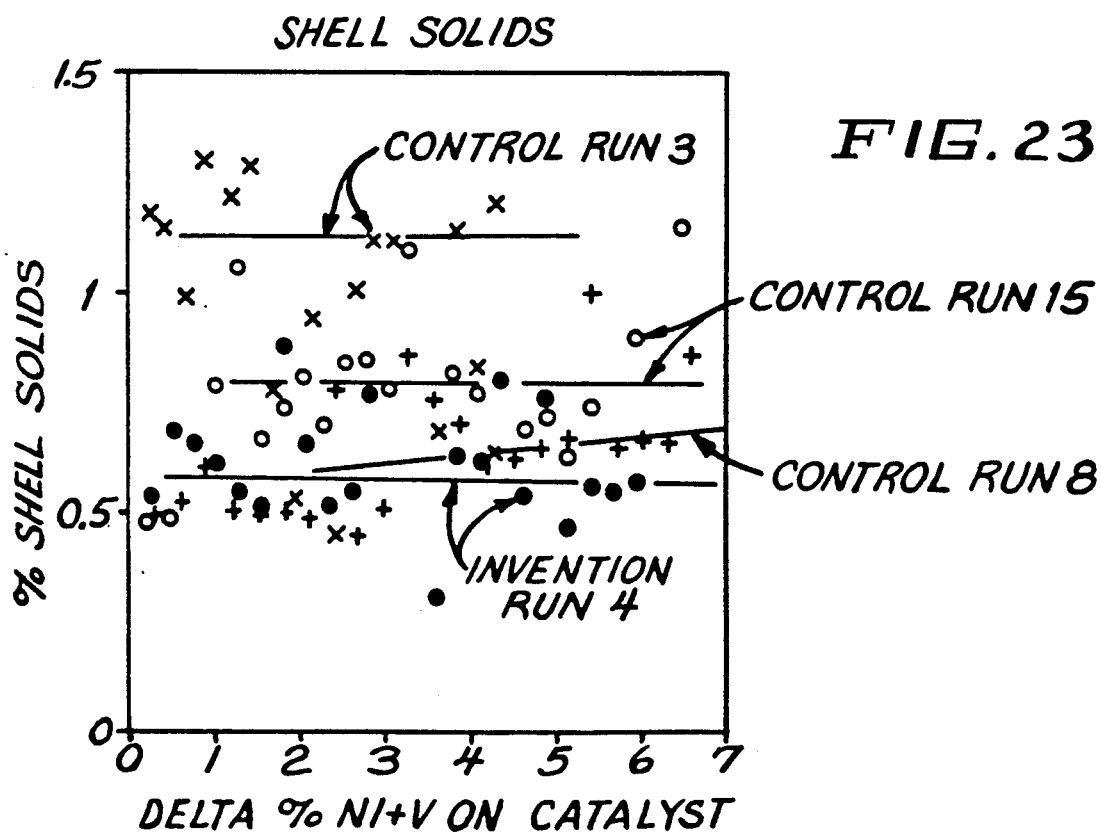
FIG. 23 is a plot of percent Shell hot filtration solids for the process of the invention and a comparative stacked process vs. % accumulation nickel plus vanadium on tested catalysts as described in Example 7.

FIG. 23 shows a plot of Shell hot filtration solids versus percent accumulation nickel plus vanadium on the catalyst.

FIG. 22 shows that the hydrodenitrogenation activity for the process of the invention and the "stacked" process was about the same.

FIG. 23 shows that the operability for the mixed catalyst system in accordance with the process of the invention is superior to the "stacked" system operability. All of the Shell hot filtration solids values fell below 1.0 wt % which is a practical upper limit for unit operability.

EXAMPLE 8

The present example serves to demonstrate the least amount of macropore volume that can be present in the large pore catalyst of the invention catalyst mixture and still be able to afford the benefits associated with the process of the invention. Run 10 previously described in Example 4 was contrasted with comparative run 16 wherein a catalyst mixture using 30 vol % catalyst I, described in Table XV, and 70 vol % catalyst C. Run 16 does not fall within the scope of the present invention because the macropore volume of catalyst I is less than that required for the second catalyst. Run 16 was carried out in the same manner as described in Example 3.

Figure 24:
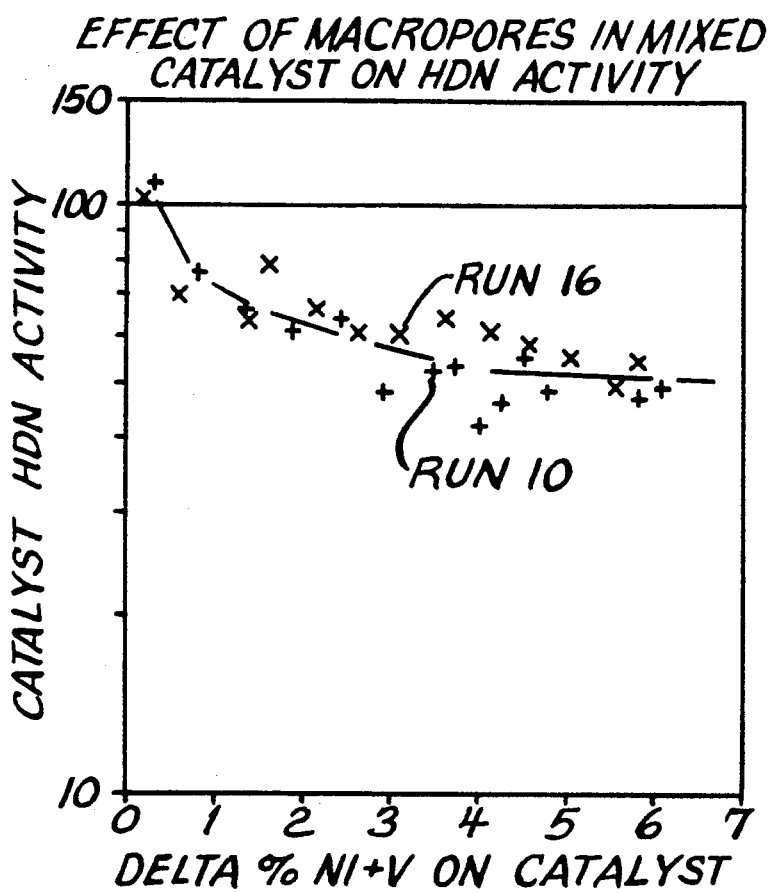
FIG. 24 is a plot of the effect of macropores on hydrodenitrogenation activity for two test mixed catalyst systems as described in Example 8.
Figure 25:
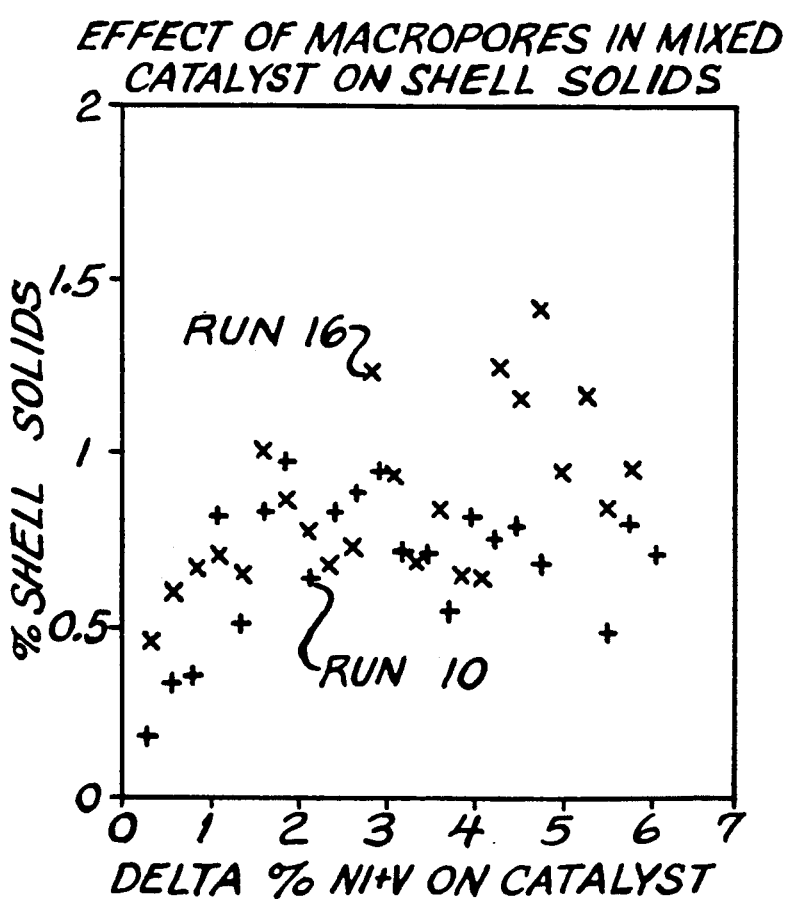
FIG. 25 is a plot of the effect of macropores on percentage Shell hot filtration solids for two test mixed catalyst systems as described in Example 8.

FIGS. 24 and 25 plot hydrodenitrogenation activity and percentage Shell hot filtration solids versus percentage accumulation nickel plus vanadium, respectively, for runs 10 and 16. The figures show that while the hydrodenitrogenation activities are similar for both runs, the Shell hot filtration solids are worse for the comparative runs due to the deficiency in 800 Å+ macropore volume.

What is claimed is:

1. A process for the hydrodemetallization, hydrodesulfurization, hydrodenitrogenation, and hydroconversion of a hydrocarbon feedstock containing asphaltenes, metals, and Shell hot filtration solids precursors which comprises contacting said feedstock with hydrogen under conversion conditions in the presence of a catalyst mixture comprising a first catalyst composition comprising a porous refractory inorganic oxide wherein said first catalyst composition possesses a pore volume of less than about 0.10 cc/g in pores having a diameter greater than about 200 Angstroms, a pore volume of less than about 0.02 cc/g in pores having a diameter greater than about 800 Angstroms, and a maximum average mesopore diameter of about 130 Angstroms; and a second catalyst composition comprising a porous refractory inorganic oxide wherein said second composition possesses a pore volume of greater than about 0.07 cc/g in pores having a diameter greater than about 800 Angstroms.

2. The process of claim 1 wherein said first catalyst composition possesses an average mesopore diameter of about 60 to about 120 Angstroms.

3. The process of claim 1 wherein said first catalyst composition possesses an average mesopore diameter of about 80 to about 100 Angstroms and a pore volume of less than about 0.05 cc/g in pores having a diameter greater than about 200 Angstroms.

4. The process of claim 1 wherein said second catalyst composition is bimodal and possesses an average mesopore diameter of about 60 to about 200 Angstroms and a pore volume of greater than about 0.1 cc/g in pores having diameters greater than about 800 Angstroms.

5. The process of claim 2 wherein said second catalyst composition possesses an average mesopore diameter of about 60 to about 200 Angstroms and a pore volume of greater than about 0.1 cc/g in pores having diameters greater than about 800 Angstroms.

6. The process of claim 3 wherein said second catalyst composition possesses an average mesopore diameter of about 60 to about 200 Angstroms and a pore volume of greater than about 0.1 cc/g in pores having diameters greater than about 800 Angstroms.

7. The process of claim 1 wherein said second catalyst composition possesses an average mesopore diameter of about 100 to about 180 Angstroms and a pore volume of greater than about 0.10 cc/g in pores having a diameter greater than about 1200 Angstroms.

8. The process of claim 2 wherein said second catalyst composition possesses an average mesopore diameter of about 100 to about 180 Angstroms and a pore volume of greater than about 0.10 cc/g in pores having a diameter greater than about 1200 Angstroms.

9. The process of claim 3 wherein said second catalyst composition possesses an average mesopore diameter of about 100 to about 180 Angstroms and a pore volume of greater than about 0.1 cc/g in pores having a diameter greater than about 1200 Angstroms.

10. The process of claim 1 wherein said first composition is present in an amount ranging from about 10 to about 90 volume % based on the total volume of said catalyst mixture.

11. The process of claim 1 wherein said first composition is present in an amount ranging from about 20 to about 80 volume % based on the total volume of said catalyst mixture.

12. The process of claim 1 wherein said first composition is present in an amount ranging from about 50 to about 70 volume % based on the total volume of said catalyst mixture.

13. The process of claim 1 wherein said catalyst mixture comprises a hydrogenation component selected from the group consisting of Group VIB, Group VII and Group V metals.

14. The process of claim 1 wherein said contacting is carried out in at least one ebullated bed reactor.

15. A dispersion comprising a hydrocarbon feedstock containing asphaltenes, metals, and Shell hot filtration solids precursors and a catalyst mixture comprising a first catalyst composition comprising a porous refractory inorganic oxide wherein said first catalyst composition possesses a pore volume of less than about 0.10 cc/g in pores having a diameter greater than about 200 Angstroms, and a pore volume of less than about 0.02 cc/g in pores having a diameter greater than about 800 Angstroms and a maximum average mesopore diameter of about 130 Angstroms; and a second catalyst composition comprising a porous refractory inorganic oxide wherein said second composition possesses a pore volume of greater than about 0.07 cc/g in pores having a diameter greater than about 800 Angstroms.

16. The dispersion of claim 15 wherein said catalyst mixture comprises a hydrogenation component selected from the group consisting of Group VIB, Group VIII and Group V metals.

* * * * *